(12) United States Patent
Ohtake

(10) Patent No.: US 6,480,341 B2
(45) Date of Patent: Nov. 12, 2002

(54) VARIABLE FOCAL LENGTH LENS SYSTEM

(75) Inventor: Motoyuki Ohtake, Urawa (JP)

(73) Assignee: Nikon Corporation, Tokyo (JP)

( * ) Notice: Subject to any disclaimer, the term of this patent is extended or adjusted under 35 U.S.C. 154(b) by 133 days.

(21) Appl. No.: 09/739,321

(22) Filed: Dec. 19, 2000

(65) Prior Publication Data

US 2001/0006432 A1 Jul. 5, 2001

(30) Foreign Application Priority Data

Dec. 20, 1999 (JP) .............................. 11-361353
Mar. 13, 2000 (JP) ..................... 2000-069068
Dec. 13, 2000 (JP) ..................... 2000-378695

(51) Int. Cl.$^7$ .............................. G02B 15/14
(52) U.S. Cl. ..................... 359/686; 359/684
(58) Field of Search .................. 359/686, 683

(56) References Cited

U.S. PATENT DOCUMENTS 5,859,729 A * 1/1999 Misaka ....................... 359/686

FOREIGN PATENT DOCUMENTS

JP 60-57814 4/1985
JP 5-264903 10/1993

* cited by examiner

*Primary Examiner*—Scott J. Sugarman
(74) *Attorney, Agent, or Firm*—Miles & Stockbridge P.C.

(57) ABSTRACT

A variable focal length lens system with an angle of view of more than 80 in the wide-angle end state capable to focusing to a near distant object is provided. According to one aspect, a variable focal length lens system includes, in order from the object side, a first lens group G1 having a positive refractive power, a second lens group G2 having a negative refractive power, a third lens group G3 having a positive refractive power, and a fourth lens group G4 having a negative refractive power. When the state of lens positions is changed from a wide-angle end state to a telephoto end state, all the lens groups are moved to the object side such that the interval between the first lens group G1 and the second lens group G2 increases, the interval between the second lens group G2 and the third lens group G3 decreases, and the interval between the third lens group G3 and the fourth lens group G4 decreases. Each lens group from the first lens group G1 through the third lens group G3 is composed of two lens elements or more. Predetermined conditional expressions are satisfied.

14 Claims, 26 Drawing Sheets

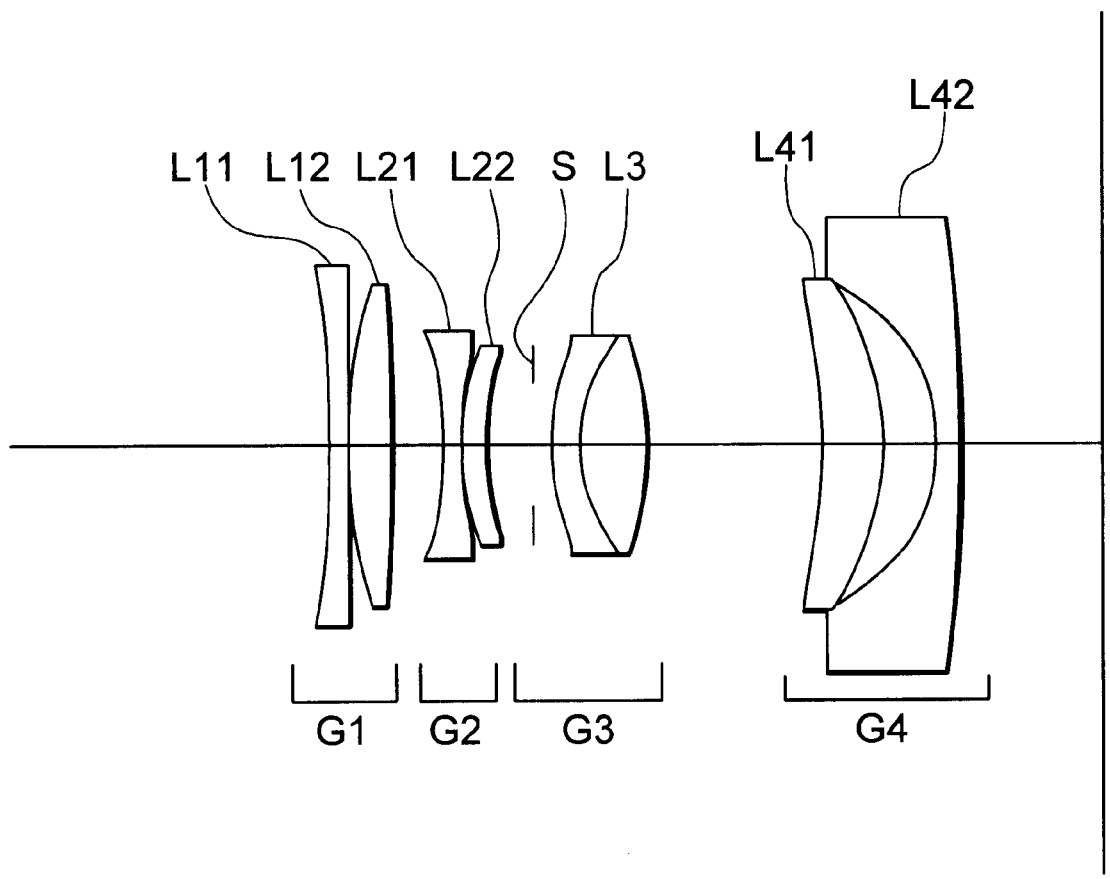

VARIABLE FOCAL LENGTH LENS SYSTEM

This application claims the benefit of Japanese Patent application Nos.11-361353, 2000-069068 and 2000-378695 which are hereby incorporated by reference.

BACKGROUND OF THE INVENTION

1. Field of the Invention

The present invention relates to a variable focal length lens system and, in particular, relates to a variable focal length lens system with an angle of view of 80° or more in the wide-angle end state.

2. Description of Related Art

The primary marketing need for a lens shutter type camera is good portability. The portability is classified into compactness and lightweight. Since the total length of a picture-taking lens affects the size of a camera body and the diameter of a lens affects the height and width of a camera body, to miniaturize a picture-taking lens greatly affects the compactness of a camera body.

It has recently become common to use a zoom lens system in a picture-taking lens used for a lens shutter type camera because a zoom lens system has a merit for a photographer to make it possible to take picture at will in accordance with variation of focal length. Moreover, since a zoom lens system having a longer focal length in a telephoto end state, which gives the longest focal length, makes it possible to take a picture closer to an object, the zooming ratio shows a tendency to become higher, so that the focal length in the telephoto end state becomes longer.

A zoom lens system used for a lens shutter type camera has had a so-called telephoto type power arrangement having a negative lens group to the most image side of the lens system and magnifying an image formed by a lens group arranged to the object side of the negative lens group. In a zoom lens system with high zoom ratio, it has been the mainstream that a so-called multi-group zoom lens having more than three movable lens groups is applied to a zoom lens system in order to increase the zoom ratio.

In one of typical examples of the specific lens constructions of these multi-group zoom lens systems, it has been known a positive-positive-negative three-group type that has, in order from an object side, a first lens group having a positive refractive power, a second lens group having a positive refractive power, and a third lens group having a negative refractive power. Moreover, for another example, it has been known a positive-negative-positive-negative four-group type that has, in order from an object side, a first lens group having a positive refractive power, a second lens group having a negative refractive power, a third lens group having a positive refractive power, and a fourth lens group having a negative lens group.

These zoom lens systems have a negative lens group to the most image side. Therefore, the back focal length in a wide-angle end state, which gives the shortest focal length, becomes short to a certain extent, and off-axis light flux passing through the negative lens group passes away from the optical axis. When the state of lens group positions is changed from the wide-angle end state to the telephoto end state, the negative lens group is moved to the object side such that the interval between an aperture stop and the negative lens group decreases, so that off-axis light flux passing through the negative lens group passes near to the optical axis, and, as a result, variation in off-axis aberrations corresponding to the change in the lens group positions is corrected well.

Furthermore, as for a positive-negative-positive-negative four-group type, zoom lens systems disclosed, for example, in Japanese Laid-Open Patent Application No. 60-57814, and as for a positive-positive-negative three-group type, zoom lens systems disclosed in Japanese Laid-Open Patent Application No. 5-264903 have been known.

Moreover, a current lens shutter type camera has an autofocus function as a standard specification.

An autofocus mechanism is composed of a detector for detecting a position of an object, a calculating system for calculating a driving amount based on an output from the detector, a driver for driving a focusing lens group, and an optical system corrected with its variation of aberrations produced while focusing.

As the autofocus function becomes a standard specification to be equipped, the focusing action is made an attempt to become faster. In order to make the focusing action fast, it is important to reduce workload (=weight×moving distance).

Moreover, if a time lag, which is a time interval from an instant a shutter button is pressed by a photographer to an instant the actual exposure starts, is too long, the photographer may feel sense of discomfort. Accordingly, the time lag is desirably to be short for a nimble picture taking.

The smaller the moving distance and the size of the focusing lens group are, the faster the focusing action can be. Therefore, in order to make the time lag in the focusing action smaller, it is important to provide an optical system having proper construction.

In the focusing method of a zoom lens system, there have been known the following three methods:

(A) a first lens group focusing type (B) an inner lens group focusing type (C) a rear lens group focusing type where in (A) a first lens group focusing type, the most object side lens group is moved, in (C) a rear lens group focusing type, the most image side lens group is moved, and, in (B) an inner lens group focusing type, an intermediate lens group is moved for focusing, respectively.

By the way, a lens shutter type camera is relatively low price and has good portability and easy handling in comparison with a single lens reflex camera. Accordingly, the user class of a lens shutter type camera has a high percentage of general class who has a camera for the purpose of family photographs and travel photographs, which have real relevance for the daily lives. Accordingly, the position of an object to be photographed tends to be rather near to the photographer.

As described above, a long focal length zoom lens is effective when the position of an object is far away. Therefore, a zoom lens system having short focal length and wide angle of view in the wide-angle end state contrary to the telephoto end state has been developed.

However, when a multi-group type zoom lens according to a prior art is used, it is very difficult to make shorter the focal length of the zoom lens in the wide-angle end state with keeping the compactness of the diameter of the zoom lens in comparison with making it longer in the telephoto end state.

In a zoom lens system with a wide angle of view, off-axis light flux passing through the aperture stop and lens groups tends to pass away from the optical axis. Moreover, when a zoom lens system keeps a wider angle of view, the brightness of the edge of the image field tends to decrease, so that in order to keep the sufficient brightness of the edge of the image field, the diameter of the lens system tends to become large. Therefore, it is not suitable for pursuing compactness.

In a lens system disclosed in Japanese Laid-Open Patent Application No. 60-57814, the angle of view in the wide-angle end state was narrow. In a lens system disclosed in Japanese Laid-Open Patent Application No. 5-264903, compactness could not be fully accomplished.

In a multi-group type zoom lens system such as a positive-positive-negative three-group type or a positive-negative-positive-negative four-group type, the diameter of the lens in the first lens group or the negative lens group located to the most image side is bigger relative to that in the other lens groups. Accordingly, the first lens group focusing method (A) and the rear lens group focusing method (C) in which the lens group having a large lens diameter is moved for focusing is not advantageous for making a camera compact, and so that it has been difficult to make the AF function (focusing movement) fast.

SUMMARY OF THE INVENTION

The present invention is made in view of the aforementioned problems and has an object to provide a variable focal length lens system with an angle of view of more than 80° in the wide-angle end state.

According to one aspect of the present invention, a variable focal length lens system includes, in order from an object side, a first lens group having a positive refractive power, a second lens group having a negative refractive power, a third lens group having a positive refractive power, and a fourth lens group having a negative refractive power. When the state of lens positions is changed from a wide-angle end state to a telephoto end state, all the lens groups are moved to the object side such that the interval between the first lens group and the second lens group increases, the interval between the second lens group and the third lens group decreases, and the interval between the third lens group and the fourth lens group decreases. Each lens group from the first lens group through the third lens group is composed of two lens elements or more. The following conditional expressions (1) and (2) are satisfied:

$$3 < f_1/f_w < 6 \quad (1)$$

$$0.3 < |f_2|/(f_w \cdot f_t)^{1/2} < 0.6 \quad (2)$$

where $f_1$ denotes the focal length of the first lens group, $f_w$ denotes the focal length of the variable focal length lens system in the wide-angle end state, $f_2$ denotes the focal length of the second lens group, and $f_t$ denotes the focal length of the variable focal length lens system in the telephoto end state.

In one preferred example of the present invention, an aperture stop is arranged between the second lens group and the third lens group, and the first lens group includes two lens elements which is a negative lens element having a concave surface facing to the object side and a positive lens element having a convex surface facing to the object side. The following conditional expression (3) is satisfied:

$$0.05 < f_w/|r_a| < 0.55 \quad (3)$$

where $r_a$ denotes the radius of curvature to the object side of the negative lens element in the first lens group.

In one preferred example of the present invention, the second lens group includes a negative lens element located to the most object side of the second lens group and the following conditional expression (4) is satisfied:

$$0.7 < f_w/|r_b| < 1.3 \quad (4)$$

where $r_b$ denotes the radius of curvature to the object side of the negative lens element located to the most object side of the second lens group.

In one preferred example of the present invention, the second lens group is composed of a double concave lens element and a positive lens element having a convex surface facing to the object side and locating to the image side of the double concave lens element. The following conditional expression (5) is satisfied:

$$0.9 < (r_c + r_d)/f_w < 1.6 \quad (5)$$

where $r_c$ denotes the radius of curvature to the image side of the double concave lens element in the second lens group, and $r_d$ denotes the radius of curvature to the object side of the positive lens element in the second lens group.

In one preferred example of the present invention, the following conditional expression (6) is satisfied:

$$1.4 < D1/D3 < 2.2 \quad (6)$$

where D1 denotes variation in air interval between the first lens group and the second lens group when the state of lens positions is moved from the wide-angle end state to the telephoto end state, and D3 denotes variation in air interval between the third lens group and the fourth lens group when the state of lens positions is moved from the wide-angle end state to the telephoto end state.

In one preferred example of the present invention, the following conditional expression (7) is satisfied:

$$0.1 < |f_4|/f_1 < 0.3 \quad (7)$$

where $f_4$ denotes the focal length of the fourth lens group.

According to another aspect of the present invention, a variable focal length lens system includes, in order from an object side, a first lens group having a positive refractive power, a second lens group having a negative refractive power, a third lens group having a positive refractive power, a fourth lens group having a negative refractive power, and an aperture stop located between the first lens group and the fourth lens group. When the state of lens positions is changed from a wide-angle end state to a telephoto end state, all the lens groups are moved to the object side such that the interval between the first lens group and the second lens group increases, the interval between the second lens group and the third lens group decreases, and the interval between the third lens group and the fourth lens group decreases. The second lens group has a negative lens having a concave surface facing to the object side, locating to the most object side of the second lens group, and is moved to the object side when the lens system is focused to a near object. The following conditional expressions (8) and (9) are satisfied:

$$1.8 < f_1/(f_w \cdot f_t)^{1/2} < 3.6 \quad (8)$$

$$0.15 < DW23/f_w < 0.25 \quad (9)$$

where $f_1$ denotes the focal length of the first lens group, $f_w$ denotes the focal length of the variable focal length lens system in the wide-angle end state, $f_t$ denotes the focal length of the variable focal length lens system in the telephoto end state, and DW23 denotes the interval between the most object side lens surface of the second lens group and the aperture stop in the wide-angle end state.

In one preferred example of the present invention, the second lens group consists of a negative lens element having double concave surfaces and a positive lens element having a convex surface facing to the object side. The following conditional expression (10) is satisfied:

$$1.3 < (|f_{2N}| + f_{2P})/f_w < 2.4 \quad (10)$$

where $f_{2N}$ denotes the focal length of the negative lens element in the second lens group, and $f_{2P}$ denotes the focal length of the positive lens element in the second lens group.

In one preferred example of the present invention, the following conditional expression (11) is satisfied:

$$1.1 < (|f_2| + f_3)/f_w < 1.4 \qquad (11)$$

where $f_2$ denotes the focal length of the second lens group, and $f_3$ denotes the focal length of the third lens group.

In one preferred example of the present invention, the following conditional expression (12) is satisfied:

$$0.2 < |f_4|/f_t < 0.4 \qquad (12)$$

where $f_4$ denotes the focal length of the fourth lens group.

BRIEF DESCRIPTION OF THE DRAWINGS

FIG. 2 is a sectional view schematically showing the configuration of a variable focal length lens system according to Example 1 of the present invention.

DESCRIPTION OF THE PREFERRED EMBODIMENTS

Figure 1:
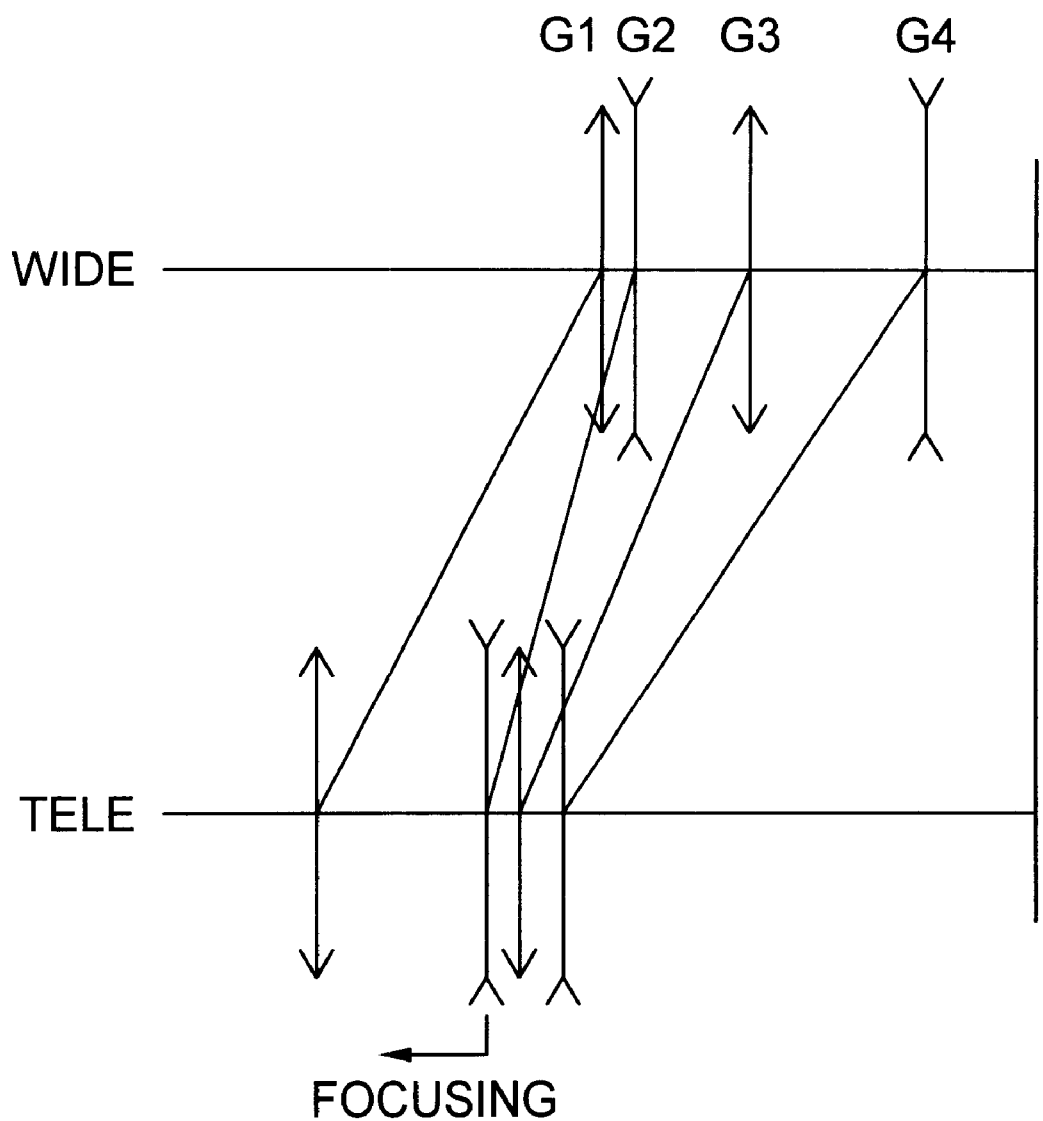
FIG. 1 is a diagram showing a distribution of refractive power in a variable focal length lens system according to the present invention.
Figure 3A:
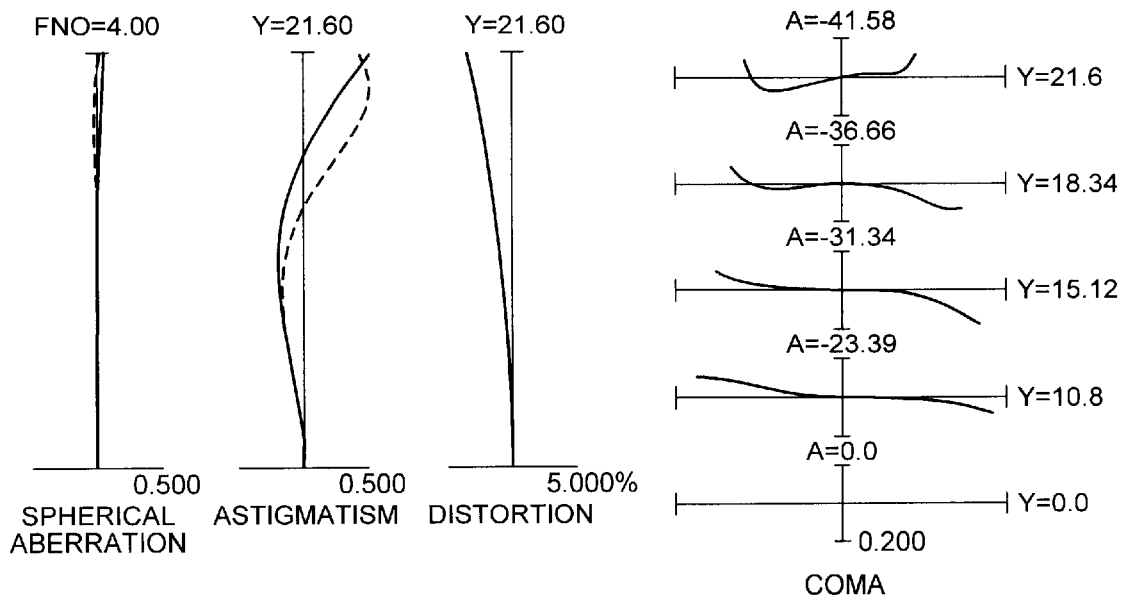
FIGS. 3A and 3B are graphs showing various aberrations in a wide-angle end state 3A and in a first intermediate focal length state 3B (focused at infinity) of the variable focal length lens system according to Example 1 of the present invention, respectively.
Figure 3B:
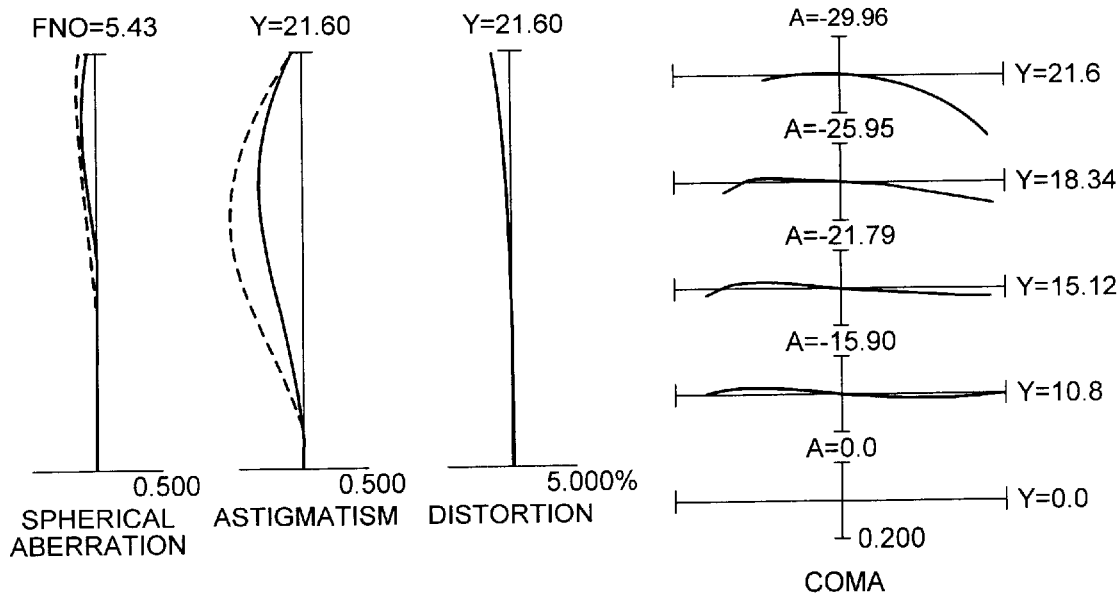
Figure 4A:
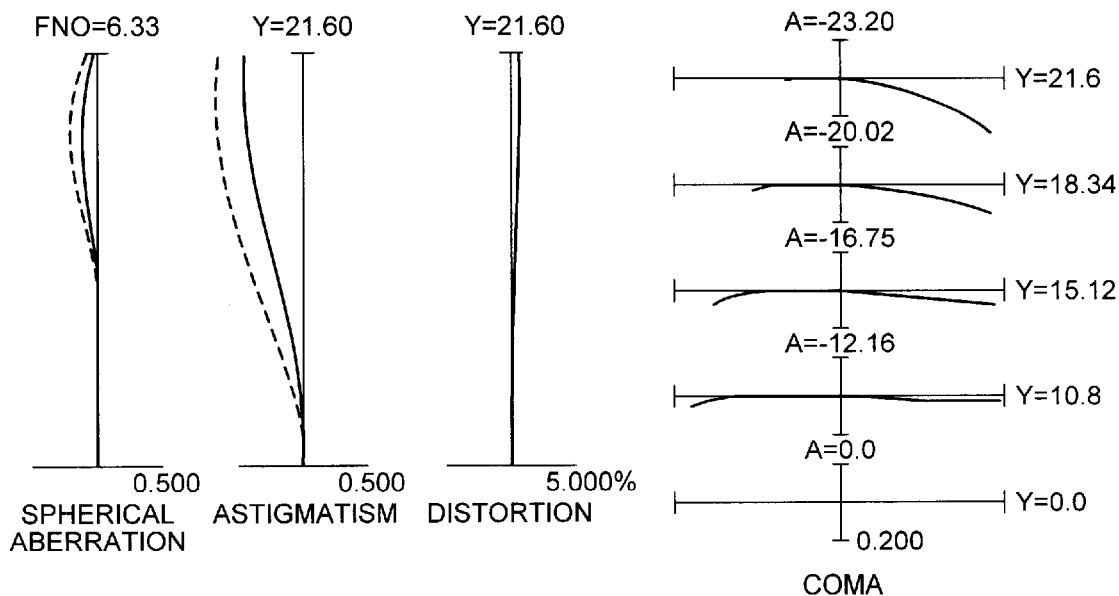
FIGS. 4A and 4B are graphs showing various aberrations in a second intermediate focal length state 4A and in a telephoto end state 4B (focused at infinity) of the variable focal length lens system according to Example 1 of the present invention, respectively.
Figure 4B:
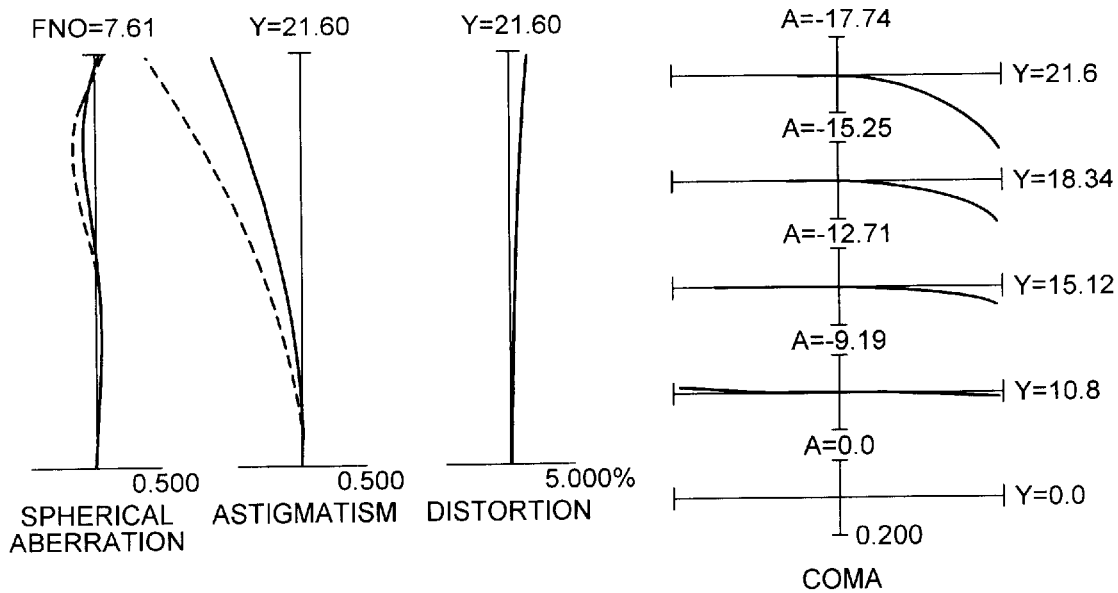
Figure 5A:
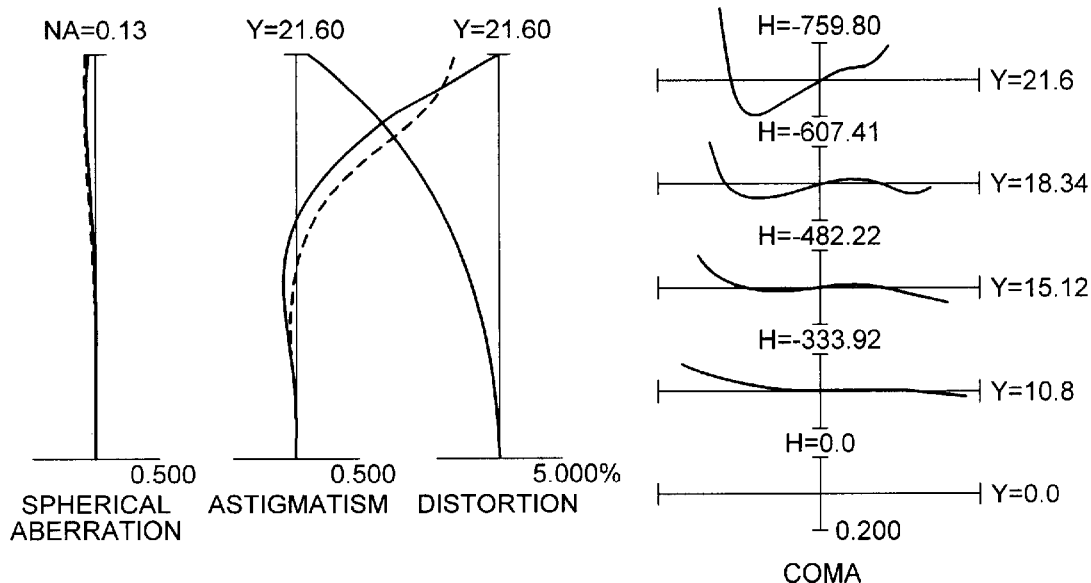
FIGS. 5A and 5B are graphs showing various aberrations in the wide-angle end state 5A and in the first intermediate focal length state 5B (focused at a near distant object) of the variable focal length lens system according to Example 1 of the present invention, respectively.
Figure 5B:
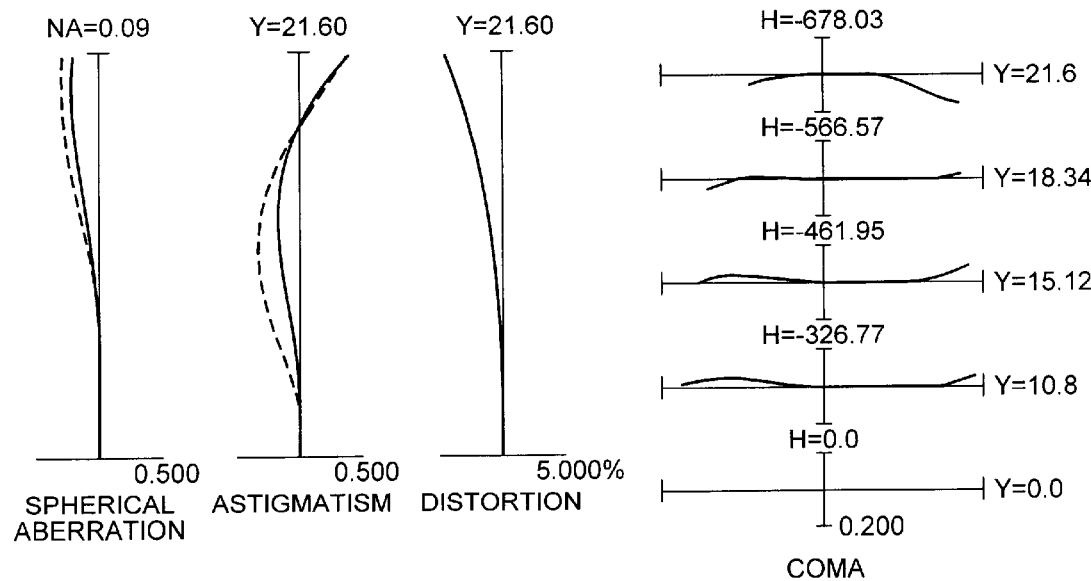
Figure 6A:
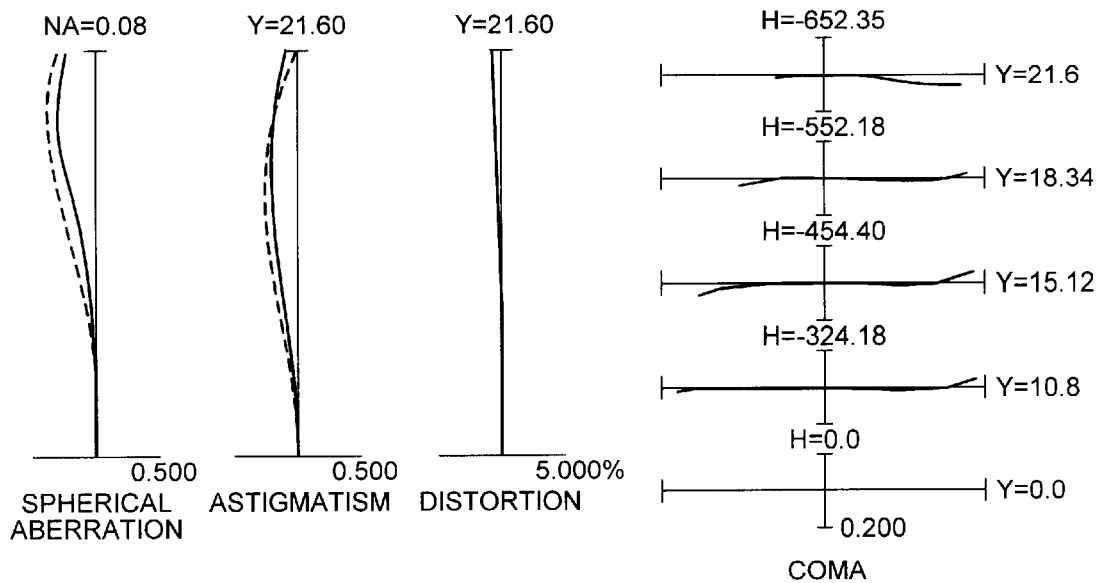
FIGS. 6A and 6B are graphs showing various aberrations in the second intermediate focal length state 6A and in the telephoto end state 6B (focused at a near distant object) of the variable focal length lens system according to Example 1 of the present invention, respectively.
Figure 6B:
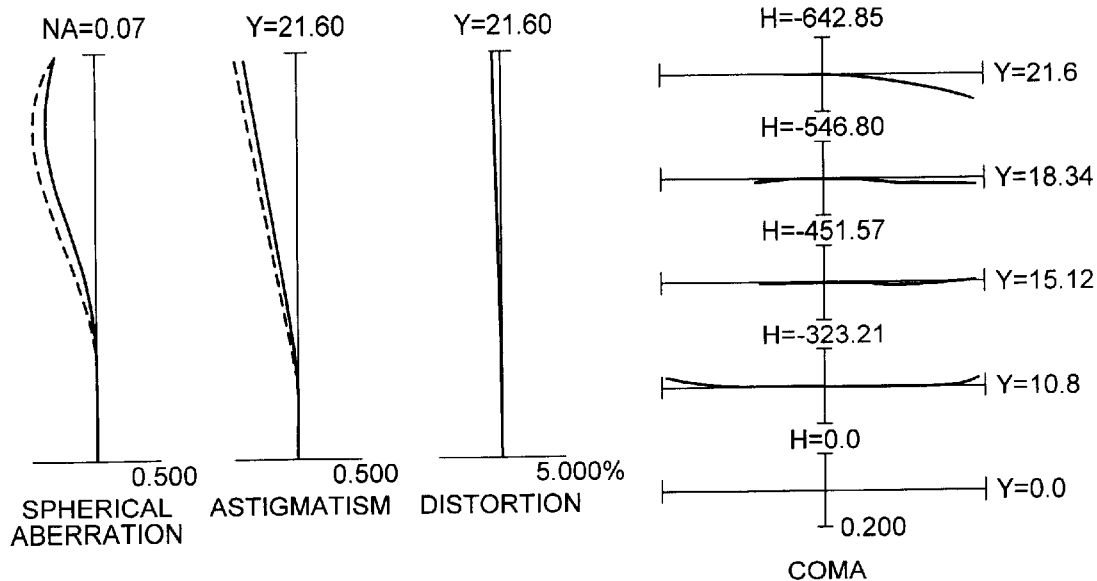

A variable focal length lens system is divided broadly into two types such as a positive leading type in which a lens group having a positive refractive power is arranged to the most object side of the lens system and a negative leading type in which a lens group having a negative refractive power is arranged to the most object side of the lens system.

The positive leading type zoom lens generally has a narrow angle of view, is used for a lens system having a long focal length in comparison with its diagonal distance of the image plane, and is suitable for shortening the total lens length. On the other hand, the negative leading type zoom lens is generally used for a lens system having a wide angle of view.

In the negative leading type zoom lens, since off-axis light flux passing through the first lens group which is located to the most object side passes near to the optical axis in the wide-angle end state, the diameter of the lens can be made smaller. However, since on-axis light flux passing through the second lens group which is located to the image side of the first lens group passes away from the optical axis in the telephoto end state when the zoom ratio is made to be high, it has been difficult to maintain optical performance at the center of the image plane.

Thus, in the present invention, a first lens group having a positive refractive power is arranged to the most object side of the lens system and a second lens group having a negative refractive power is arranged to the image side of the first group. Moreover, in the wide-angle end state, the interval between the first and second lens groups is narrowed in order that off-axis light flux passing through the first lens group do not pass away from the optical axis and the interval between the first and second lens groups becomes wide on changing the state of the lens group position to the telephoto end state in order to shorten the total lens length in the telephoto end state.

In particular, to make the diameter of the lens compact and to make the total lens length short can be balanced by arranging that the focal length of the first lens group satisfies conditional expression (1) and that that of the second lens group satisfies conditional expression (2).

Specially, in the present invention, in order to make the diameter of the lens compact by providing sufficient back focal length in the wide-angle end state, a negative lens having a concave surface facing to the object side is arranged to the most object side of the second lens group.

In the present invention, four lens groups are arranged such that a third lens group having a positive refractive power is arranged to the image side of the second lens group and a fourth lens group having a negative refractive power is arranged to the image side of the third lens group.

As indicated by conditional expressions (1) and (2), since the positive refractive power of the first lens group is weak and the negative refractive power of the second lens group is strong, a strong positive refractive power cannot be provided only by the first and second lens groups.

Accordingly, the refractive power from the first lens group to the third lens group is made to be positive by arranging a third lens group having a positive refractive power to the image side of the second lens group. Then, the total lens length is shortened by enlarging the image by means of a fourth lens group arranged to the image side of the third lens group.

Furthermore, the total lens length in the telephoto end state is shortened by narrowed the interval between the second and third lens groups when the state of the lens positions is changed from the wide-angle end state to the telephoto end state, and, moreover, since off-axis light flux passing through the fourth lens group passes near the optical axis by narrowing the interval between the third and fourth lens groups, the variation in off-axis aberrations produced while zooming can be corrected well.

By the way, it is important for a zoom lens system having a large angle of view in the wide-angle end state to set the position of an aperture stop properly.

It is advantageous for miniaturizing the diameter of the lens that the aperture stop is located in the vicinity of the center of the lens system. This is because off-axis light flux passing through a lens group located away from the aperture stop passes away from the optical axis. For example, when the aperture stop is arranged between the first lens group and the second lens group, off-axis light flux passing through the fourth lens group passes extremely away from the optical axis.

In the present invention, since the aperture stop is arranged between the second lens group and the third lens group and is moved together with the third lens group when the state of the lens positions is changed, the first lens group is moved away from the aperture stop and off-axis light flux passing through the first lens group passes away from the optical axis when the state of the lens positions is changed from the wide-angle end state to the telephoto end state. Moreover, the fourth lens group is moved near to the aperture stop and off-axis light flux passing through the fourth lens group passes near to the optical axis. Thus, off-axis aberrations can be corrected well by arranging each lens group such that the height of off-axis light flux passing through each lens group changes actively.

Furthermore, the focusing action can be made fast by arranging the aperture stop like this and by moving the second lens group whose diameter of the lens is small while focusing to a near object.

In the present invention, as described above, four lens groups are arranged such that, in order from the object side, a first lens group having a positive refractive power, a second lens group having a negative lens group, a third lens group having a positive refractive power, and a fourth lens group having a negative refractive power. When the state of the lens positions is changed from the wide-angle end state which provides the shortest focal length to the telephoto end state which provides the longest focal length, respective lens groups move to the object side such that the interval between the first and second lens groups increases, the interval between the second and third lens groups decreases, and the interval between the third and fourth lens groups decreases. Refractive power of each lens group is set to satisfy conditional expressions (1) and (2). As a result, a compact zoom lens having an angle of view of 80° or over in the wide-angle end state capable of focusing to a near object can be obtained.

Moreover, in the present invention, since aberrations produced from each lens group are necessary to be corrected well to obtain preferable imaging performance, it is desirable that each lens group from the first lens group to the third lens group is composed of more than two lens elements.

Respective conditional expressions are explained below.

Conditional expression (1) defines an appropriate range of the focal length of the first lens group.

When the ratio $f_1/f_w$ falls below the lower limit of conditional expression (1), off-axis light flux passing through the first lens group passes away from the optical axis, so that the diameter of the first lens group becomes large, and curvature of field in the periphery of the image plane becomes excessively large as well, and, as a result, good optical performance cannot be obtained. This is not desirable.

On the other hand, when the ratio exceeds the upper limit of conditional expression (1), convergence of the first lens group becomes weak, so that the total lens length in the telephoto end state cannot be sufficiently shortened.

Conditional expression (2) defines an appropriate range of the focal length of the second lens group.

When the ratio $|f_2|/(f_w \cdot f_t)^{1/2}$ exceeds the upper limit of conditional expression (2), off-axis light flux passing through the first and second lens groups passes away from the optical axis in the wide-angle end state, so that the diameter of the lens becomes large.

On the other hand, when the ratio falls below the lower limit of conditional expression (2), the total lens length in the telephoto end state cannot be sufficiently shortened. In the present invention, it is preferable for higher optical performance to set the upper and lower limits of conditional expression (2) 0.52 and 0.40, respectively.

In the present invention, the first lens group preferably has a negative lens having a concave surface facing to the object side and a positive lens having a convex surface facing to the object side. The diameter of the first lens group can be small by arranging the negative lens having a concave surface facing to the object side. The total lens length in the telephoto end state can be shortened by arranging the positive lens having a convex surface facing to the object side.

The radius of curvature to the object side of the negative lens is preferably set to satisfy conditional expression (3):

$$0.05 < f_w/|r_a| < 0.55 \qquad (3)$$

where $f_w$ denotes the focal length of the variable focal length lens system in the wide-angle end state, and $r_a$ denotes the radius of curvature to the object side of the negative lens arranged in the first lens group.

When the ratio $f_w/|r_a|$ exceeds the upper limit of conditional expression (3), deterioration in the optical performance caused by a mutual decentering between the negative lens and the positive lens in the first lens group becomes large, so that it becomes difficult to maintain stable optical quality of the lens system.

On the other hand, when the ratio falls below the lower limit of conditional expression (3), the diameter of the first lens group becomes large, so that it is undesirable.

Moreover, the first lens group is preferably composed of, in order from the object side, a negative lens having a concave surface facing to the object side, a positive lens having a convex surface facing to the object side.

In the present invention described above, in order to maintain sufficient back focal length in the wide-angle end state, a negative lens is arranged to the most object side of the second lens group and the following conditional expression (4) is preferably satisfied:

$$0.7 < f_w/|r_b| < 1.3 \qquad (4)$$

where $r_b$ denotes the radius of curvature to the object side of the negative lens arranged to the most object side of the second lens group.

When the ratio $f_w/|r_b|$ exceeds the upper limit of conditional expression (4), positive curvature of field is largely produced in the wide-angle end state, so that good optical performance cannot be obtained.

On the other hand, when the ratio falls below the lower limit of conditional expression (4), sufficient back focal length cannot be maintained in the wide-angle end state, the diameter of the fourth lens group becomes large because off-axis light flux passing through the fourth lens group passes away from the optical axis, and positive distortion is largely produced.

However, in the positive-positive-negative three-group type and the positive-negative-positive-negative four-group type according to prior art, the lateral magnification of the negative lens group located to the most object side is largely varied when the state of the lens positions is varied. Accordingly, in order to suppress variation of off-axis aberrations produced by the negative lens group on changing the state of lens positions, the back focal length in the wide-angle end state is made short, so that off-axis light flux passing through the negative lens group passes largely away from the optical axis and, as a result, the diameter of the lens becomes large when the angle of view is made wider.

At this point, a sufficient back focal length can be maintained in the wide-angle end state, and variation in lateral magnification of the fourth lens group can be suppressed by making the refractive power of the second lens group stronger. In the present invention, the second lens group is constructed by a double concave lens and a positive lens having a convex surface facing to the object side located to the image side of the double concave lens. The refractive power of the second lens group is made stronger by constructing the second lens group to satisfy conditional expression (5):

$$0.9 < (r_c + r_d)/f_w < 1.6 \qquad (5)$$

where $r_c$ denotes the radius of curvature to the image side of the double concave lens in the second lens group, $r_d$ denotes the radius of curvature to the object side of the positive lens in the second lens group.

Although when the refractive power of the second lens group is made stronger, the diameter of the fourth lens group becomes smaller, degradation of optical performance caused by the mutual decentering between the second and third lens groups becomes large. In the present invention, in order to make the diameter of the fourth lens group smaller and to make the refractive power of the second lens group weaker, the second lens group is made to have a negative-positive construction, so that the principal point of the second lens group is made to locate to the object side of the second lens group.

Conditional expression (5) defines the shape of the air interval formed between the negative and positive lenses composing the second lens group.

When the ratio $(r_c + r_d)/f_w$ exceeds the upper limit of conditional expression (5), the principal point of the second lens group moves to the image side, so that the refractive power of the second lens group is necessary to increase and, as a result, degradation of optical performance caused by mutual decentering between the second and third lens groups occurs largely.

On the other hand, when the ratio falls below the lower limit of conditional expression (5), degradation of optical performance caused by mutual decentering between the second and third lens groups becomes severe, so that a zoom lens having stable optical performance cannot be provided on the market.

In the present invention, in order to keep balance between making the diameter of the lens small and making the total lens length short, it is preferable to satisfy either one of conditional expressions (6) and (7):

$$1.4 < D1/D3 < 2.2 \tag{6}$$

$$0.1 < |f_4|/f_1 < 0.3 \tag{7}$$

where D1 denotes the variation in the air interval between the first and second lens groups when the state of lens positions changes from the wide-angle end state to the telephoto end state, D3 denotes the variation in the air interval between the third and fourth lens groups when the state of lens positions changes from the wide-angle end state to the telephoto end state, and $f_4$ denotes the focal length of the fourth lens group.

Conditional expression (6) defines an appropriate range of the ratio of the variation in the air interval between the first and second lens groups relative to the variation in the air interval between the third and fourth lens groups.

When the ratio D1/D3 exceeds the upper limit of conditional expression (6), although the total lens length in the telephoto end state can be made short, off-axis light flux passing through the first lens group passes away from the optical axis, so that the diameter of the first lens group becomes large.

On the other hand, when the ratio falls below the lower limit of conditional expression (6), off-axis light flux passing through the fourth lens group in the wide-angle end state passes away from the optical axis, so that the diameter of the lens becomes large.

Conditional expression (7) defines an appropriate range of a ratio between the focal length of the fourth lens group and that of the first lens group.

When the ratio $|f_4|/f_1$ exceeds the upper limit of conditional expression (7), off-axis light flux passing through the first and fourth lens groups passes away from the optical axis in the wide-angle end state, so that the lens system cannot be sufficiently compact. On the other hand, when the ratio falls below the lower limit of conditional expression (7), the total lens length in the telephoto end state cannot be sufficiently shortened.

Conditional expression (8) defines an appropriate range of the focal length of the first lens group.

The diameter of the second lens group can be small by arranging the aperture stop as described before. However, when a moving distance is large, a workload cannot be reduced. On assuming the lateral magnification β while zooming to be |β|>1, it has been known that the moving distance while zooming can be smaller by bringing $\beta^2/(\beta^2-1)$ near to 1, that is, 1/β near to 0. Moreover, when |β|<1, it has been known that the moving distance while zooming can be smaller by bringing $\beta^2/(\beta^2-1)$ near to 0, that is, β near to 0.

In the present invention, although the moving distance is reduced by bringing lateral magnification of the second lens group near to 0, the state that the lateral magnification becomes 0 means that the refractive power of the first lens group becomes 0, so that the total lens length in the telephoto end state becomes long. Accordingly, both reducing the total lens length in the telephoto end state and reducing the moving distance while zooming can be accomplished by setting the focal length of the first lens group satisfying conditional expression (8).

When the ratio $f_1/(f_w \cdot f_t)^{1/2}$ exceeds the upper limit of conditional expression (8), the total lens length in the telephoto end state becomes long, so it is not desirable. On the other hand, when the ratio falls below the lower limit of conditional expression (8), the moving distance of the second lens group while zooming becomes long.

Conditional expression (9) is for preferably correcting the variation in off-axis aberrations in the wide-angle end state produced while focusing.

When the ratio $DW23/f_w$ exceeds the upper limit of conditional expression (9), off-axis light flux passing the lens surface locating to the most object side of the second lens group passes away from the optical axis. Since the lens surface is a concave surface facing to the object side, off-axis aberrations are suddenly produced on leaving off-axis light flux away from the optical axis, so that predetermined optical performance cannot be obtained.

In the present invention, in order to keep stable optical quality while manufacturing and to accomplish compactness, the second lens group is composed of a negative lens element having double concave surfaces and a positive lens element having a convex surface facing to the object side. The following conditional expression (10) is preferably satisfied:

$$1.3 < (|f_{2N}|+f_{2P})/f_w < 2.4 \tag{10}$$

where $f_{2N}$ denotes the focal length of the negative lens element in the second lens group, and $f_{2P}$ denotes the focal length of the positive lens element in the second lens group.

In the present invention, the principal point of the second lens group is located to the object side of the second lens group by being composed the second lens group of a negative lens element and a positive lens element located to the image side of the negative lens element. As a result, off-axis light flux passing through the first lens group passes near to the optical axis in the wide-angle end state, so that the diameter of the lens is made small.

Conditional expression (10) defines an appropriate range of the focal length of the negative and positive lens elements in the second lens group.

When the ratio $(|f_{2N}|+f_{2P})/f_w$ falls below the lower limit of conditional expression (10), degradation of optical performance caused by mutual decentering between the negative and positive lens elements becomes large, so that a zoom lens having stable optical performance cannot be provided on the market.

On the other hand, when the ratio exceeds the upper limit of conditional expression (10), each refractive power of the negative lens element and the positive lens element becomes weak, so that the principal point of the second lens group comes closer to the image side and, as a result, the diameter of the lens becomes large.

Furthermore, in the present invention, the following conditional expression (11) is preferably satisfied to obtain further satisfactory optical performance in the wide-angle end state and the following conditional expression (12) is also preferably satisfied to make the total lens length in the telephoto end state short:

$$1.1 < (|f_2|+f_3)/f_w < 1.4 \tag{11}$$

$$0.2 < |f_4|/f_t < 0.4 \tag{12}$$

where $f_2$ denotes the focal length of the second lens group, and $f_3$ denotes the focal length of the third lens group.

Conditional expression (11) defines an appropriate range of the focal length of the second and third lens groups.

When the ratio $(|f_2|+f_3)/f_w$ exceeds the upper limit of conditional expression (11), off-axis light flux passing through the first and fourth lens group passes away from the optical axis in the wide-angle end state, so that coma is produced and optical performance in the periphery of the image plane. On the other hand, when the ratio falls below the lower limit of conditional expression (11), off-axis light flux passing through the second and third lens groups passes near to the optical axis, so that on-axis aberrations and off-axis aberrations cannot be corrected independently and, as a result, optical performance at the center and that of in the periphery of the image plane cannot be balanced.

Conditional expression (12) defines an appropriate range of the focal length of the fourth lens group. When the ratio $|f_4|/f_t$ exceeds the upper limit of conditional expression (12), the total lens length in the telephoto end state cannot be made sufficiently short, so that it is not desirable. On the other hand, when the ratio falls below the lower limit of conditional expression (12), lateral magnification of the fourth lens group becomes large in the telephoto end state and, as a result, it is undesirable that the image plane is shifted from the film plane by a minute stopping error.

In each examples of the present invention, although the second lens group is moved to the object side for focusing to a near object, focusing to a near object can also be performed by moving the third or fourth lens group along the optical axis. Moreover, the first lens group is not suitable to perform focusing to a near object because it needs a longer moving distance because of its weak refractive power as described above. When the focusing is performed by other than the second lens group, it is preferable to use the third lens group having a relatively small lens diameter.

Furthermore, although each example described below is composed of four movable lens groups, other lens groups having a weak refractive power can easily added between respective lens groups or to the object or image side of respective lens groups.

In the present invention, from another point of view, it is possible that the optical system is made to be an anti-vibration optical system preventing image blurring caused by camera shake, or the like, liable to be occurred to a high-zoom-ratio lens while taking picture. In order to prevent this, a moving detector detecting camera shake and a driving unit are combined to the optical system, and the optical system is constructed such that a whole lens group or a portion of a lens group comprising the optical system can be decentered as a decentering lens group. Image blurring can be corrected by detecting camera shake by the moving detector, decentering the decentering lens group by the driving unit, and shifting image by the decentering lens group. In this construction, an optical system can be made to be an anti-vibration optical system being able to prevent image blurring.

The numerical examples of the variable focal length lens system according to the present invention will be explained below with reference to accompanying drawings. By the way, in each example, an aspherical surface is expressed by the following expression:

$$x=cy^2/\{1+(1-\kappa c^2 y^2)^{1/2}\}+C_4 y^4+C_6 y^6+\cdots$$

where y denotes the height in a vertical direction relative to the optical axis, x denotes a sag amount, c denotes a radius of curvature, κ denotes the conical coefficient, and $C_4$, $C_6$, $\cdots$ denote the aspherical surface coefficient of respective orders.

FIG. 1 is a diagram showing a distribution of refractive power in a variable focal length lens system according to each example. The variable focal length lens system is composed of, in order from the object side, a first lens group G1 having a positive refractive power, a second lens group G2 having a negative refractive power, a third lens group G3 having a positive refractive power, and a fourth lens group G4 having a negative refractive power. when the state of lens positions is changed from a wide-angle end state to a telephoto end state, all the lens groups are moved to the object side such that the interval between the first lens group G1 and the second lens group G2 increases, the interval between the second lens group G2 and the third lens group G3 decreases, and the interval between the third lens group G3 and the fourth lens group G4 decreases.

EXAMPLE 1

FIG. 2 is a sectional view schematically showing the configuration of a variable focal length lens system according to Example 1 of the present invention. The first lens group G1 is composed of a negative lens L11 having a concave surface facing to the object side and a double convex lens L12. The second lens group G2 is composed of a double concave lens L21 and a positive lens L22 having a convex surface facing to the object side. The third lens group G3 is composed of a positive cemented lens L3 composed of a negative meniscus lens having a convex surface facing to the object side and a double convex lens. The fourth lens group G4 is composed of a positive meniscus lens L41 having a convex surface facing to the image side and a negative meniscus lens L42 having a concave surface facing to the object side.

In this example, an aperture stop S is arranged to the object side of the third lens group G3, and is moved together with the third lens group G3 when the state of lens positions is changed.

Various values associated with Example 1 are listed in Table 1. In Table 1, f denotes the focal length, FNO denotes the f-number, and 2ω denotes an angle of view (unit:degree). The refractive index is a value for d-line (λ=587.6 nm). In Tables above and below, a fact that radius of curvature is 0, means that the corresponding lens surface is a plane. In the following each example, "mm" is generally used for the unit of length of the focal length f, radius of curvature r, space between surfaces d, or the like unless otherwise specified. However, since an optical system proportionally enlarged or reduced its dimension can be obtained similar optical performance, the unit is not necessary to be limited to "mm" and any other suitable unit can be used. In various values of all examples listed below are denoted by the same symbols used in Example 1.

TABLE 1

| f | 25.20~38.00~50.00~66.50 |
|---|---|
| FNO | 4.10~5.43~6.35~7.50 |
| 2ω | 83.20~58.54~45.86~35.21° |

| surface number | radius of curvature | surface distance | refractive index | Abbe number |
|---|---|---|---|---|
| 1 | −73.9297 | 0.9000 | 1.80610 | 33.28 |
| 2 | 4127.6121 | 0.1000 | 1.0 | |
| 3 | 32.3347 | 2.3496 | 1.58913 | 61.24 |
| 4 | −207.2232 | (D4) | 1.0 | |
| 5 | −20.1825 | 0.8000 | 1.80420 | 46.51 |
| 6 | 23.5388 | 0.1000 | 1.0 | |
| 7 | 14.3409 | 1.3390 | 1.80518 | 25.46 |
| 8 | 24.8834 | (D8) | 1.0 | |
| 9 | 0.0000 | 0.8500 | 1.0 | aperture stop |
| 10 | 15.1345 | 1.5000 | 1.92286 | 20.88 |
| 11 | 9.2552 | 3.3849 | 1.74330 | 49.23 |
| 12 | −17.6535 | (D12) | 1.0 | |
| 13 | −32.8888 | 3.5000 | 1.68893 | 31.16 |
| 14 | −15.3882 | 2.6668 | 1.0 | |
| 15 | −9.7543 | 1.0000 | 1.77250 | 49.61 |
| 16 | −139.0915 | (Bf) | 1.0 | |

TABLE 1-continued aspherical coefficient

<surface number 5>

$\kappa = 1.000$     $C_4 = -7.9263 \times 10^{-5}$     $C_6 = +1.1903 \times 10^{-6}$
              $C_8 = -7.5650 \times 10^{-8}$     $C_{10} = +1.3919 \times 10^{-9}$ <surface number 12>

$\kappa = 3.346$     $C_4 = +1.7152 \times 10^{-4}$     $C_6 = +4.5571 \times 10^{-7}$
              $C_8 = +1.9520 \times 10^{-8}$     $C_{10} = -1.8749 \times 10^{-10}$ <surface number 13>

$\kappa = -2.7617$   $C_4 = +7.0681 \times 10^{-5}$     $C_6 = -1.2571 \times 10^{-6}$
              $C_8 = +2.2397 \times 10^{-8}$     $C_{10} = -1.0092 \times 10^{-10}$ Variable intervals during zooming

| f   | 25.2004 | 38.0013 | 50.0021 | 66.5033 |
|-----|---------|---------|---------|---------|
| D4  | 2.8376  | 6.1764  | 10.1443 | 14.9116 |
| D8  | 2.4413  | 1.9145  | 1.1651  | 0.4196  |
| D12 | 9.2832  | 4.6885  | 2.9393  | 1.4707  |
| Bf  | 7.6344  | 19.9689 | 28.8529 | 39.7095 | moving distance Δ2 of the second lens group G2 while focusing from infinity to near object (magnification = −1/30) where the movement toward object is assumed to be positive

| f  | 25.2004 | 38.0013 | 50.0021 | 66.5033 |
|----|---------|---------|---------|---------|
| Δ2 | 0.9375  | 0.6870  | 0.5905  | 0.5205  | values for the conditional expressions $f_1 = +99.303$
$f_2 = -19.747$
$f_3 = +12.638$
$f_4 = -21.810$
$f_{2N} = -13.402$
$f_{2P} = +39.785$
(1) $f_1/f_w = 3.941$
(2) $|f_2|/(f_w \cdot f_t)^{1/2} = 0.482$
(3) $f_w/|r_a| = 0.341$
(4) $f_w/|r_b| = 0.801$
(5) $(r_c + r_d)/f_w = 1.503$
(6) $D1/D3 = 1.545$
(7) $|f_4|/f_1 = 0.220$
(8) $f_1/(f_w \cdot f_t)^{1/2} = 2.426$
(9) $DW23/f_w = 0.186$
(10) $(|f_{2N}| + f_{2P})/f_w = 2.111$
(11) $(|f_2| + f_3)/f_w = 1.285$
(12) $|f_4|/f_t = 0.328$ FIGS. 3A, 3B, 4A, and 4B are graphs showing various aberrations in a state focused at infinity in a wide-angle end state (f=25.20), a first intermediate focal length state (f=38.00), a second intermediate focal length state (f=50.00), and a telephoto end state (f=66.50) of the variable focal length lens system according to Example 1 of the present invention, respectively.

FIGS. 5A, 5B, 6A, and 6B are graphs showing various aberrations in a state focused at a near object (magnification: −1/30) in the wide-angle end state (f=25.20), the first intermediate focal length state (f=38.00), the second intermediate focal length state (f=50.00), and the telephoto end state (f=66.50) of the variable focal length lens system according to Example 1 of the present invention, respectively.

In each aberration diagrams shown above, in the diagram showing spherical aberration, a solid line indicates spherical aberration, a broken line indicates the sine condition, and y denotes image height. In the diagram showing astigmatism, a solid line indicates a sagittal image plane and a broken line indicates a meridional image plane. In the diagram showing coma, coma relative to the image height y=0, 10.8, 15.12, 18.34, and 21.6 are shown. A denotes an angle of view. H denotes an object height.

As apparent from the respective diagrams showing various aberrations, excellent compensation is made for the various aberrations at the respective image distances and at the respective focal lengths.

EXAMPLE 2

Figure 7:
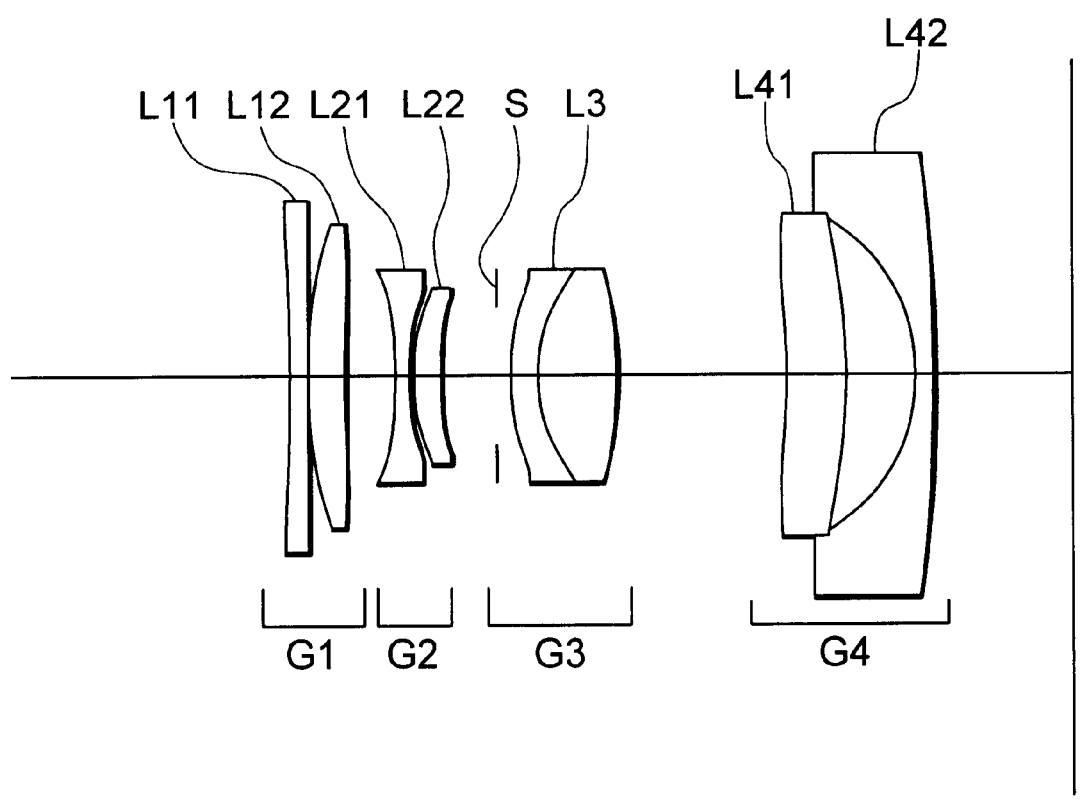
FIG. 7 is a sectional view schematically showing the configuration of a variable focal length lens system according to Example 2 of the present invention.
Figure 8A:
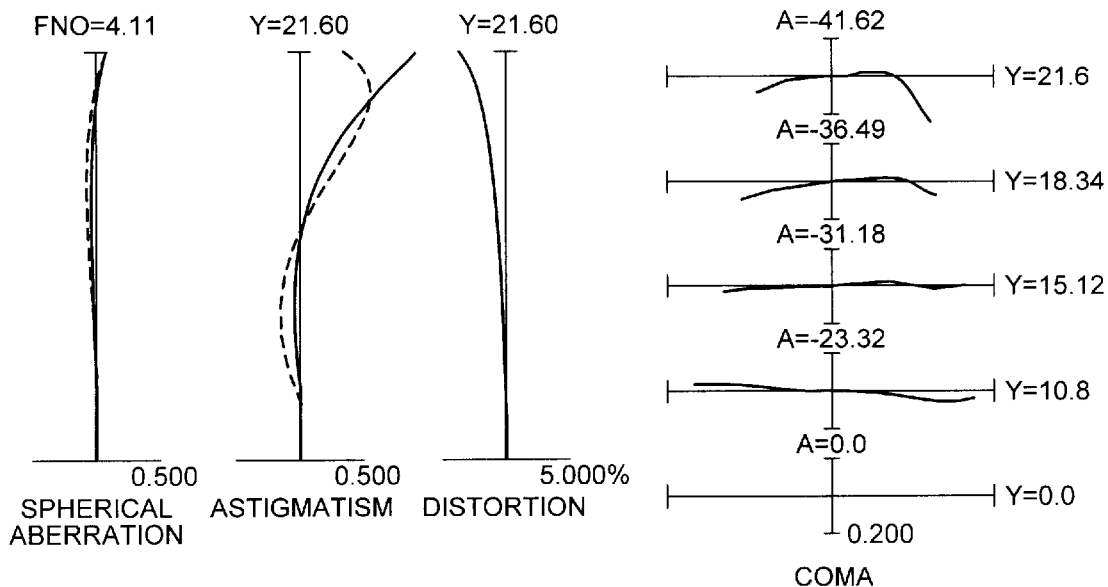
FIGS. 8A and 8B are graphs showing various aberrations in a wide-angle end state 8A and in a first intermediate focal length state 8B (focused at infinity) of the variable focal length lens system according to Example 2 of the present invention, respectively.
Figure 8B:
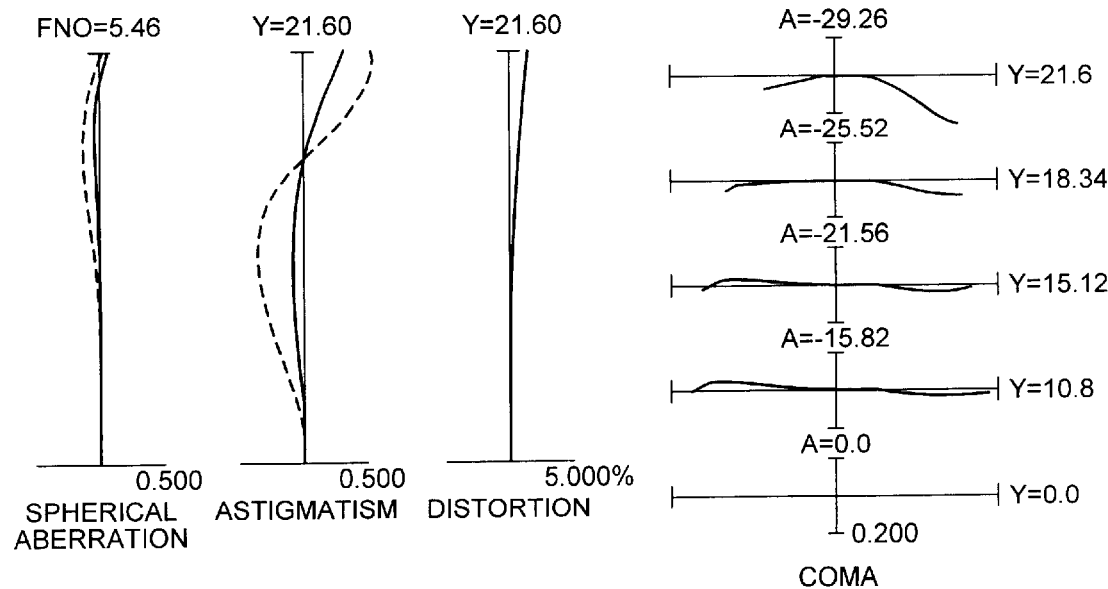
Figure 9A:
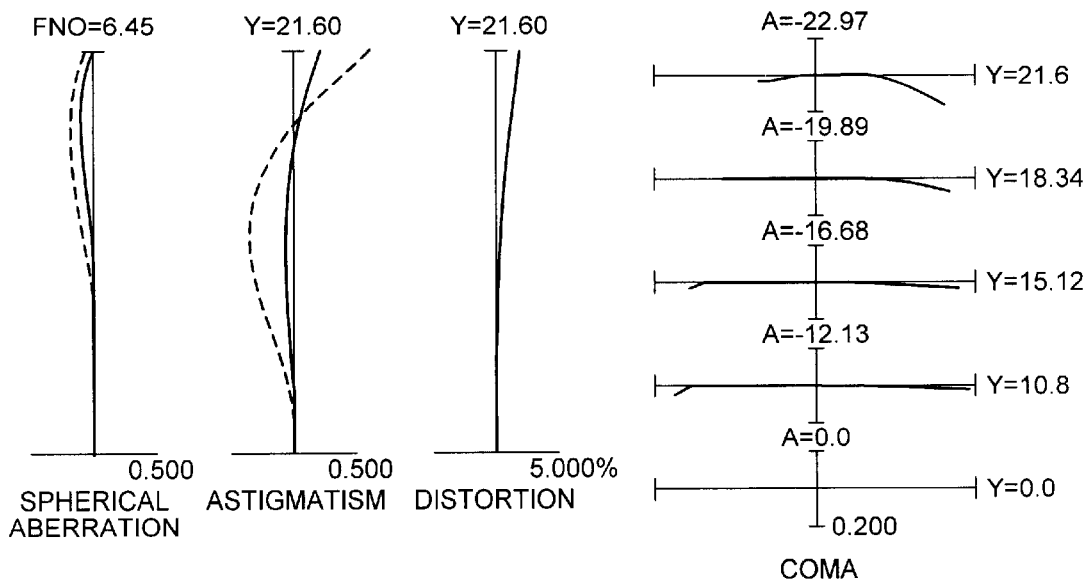
FIGS. 9A and 9B are graphs showing various aberrations in a second intermediate focal length state 9A and in a telephoto end state 9B (focused at infinity) of the variable focal length lens system according to Example 2 of the present invention, respectively.
Figure 9B:
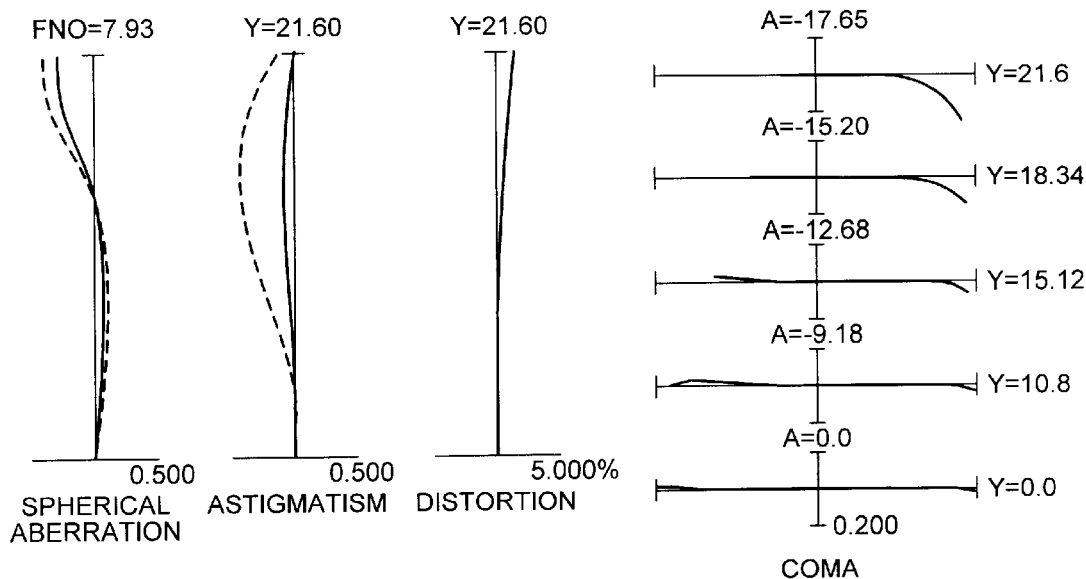
Figure 10A:
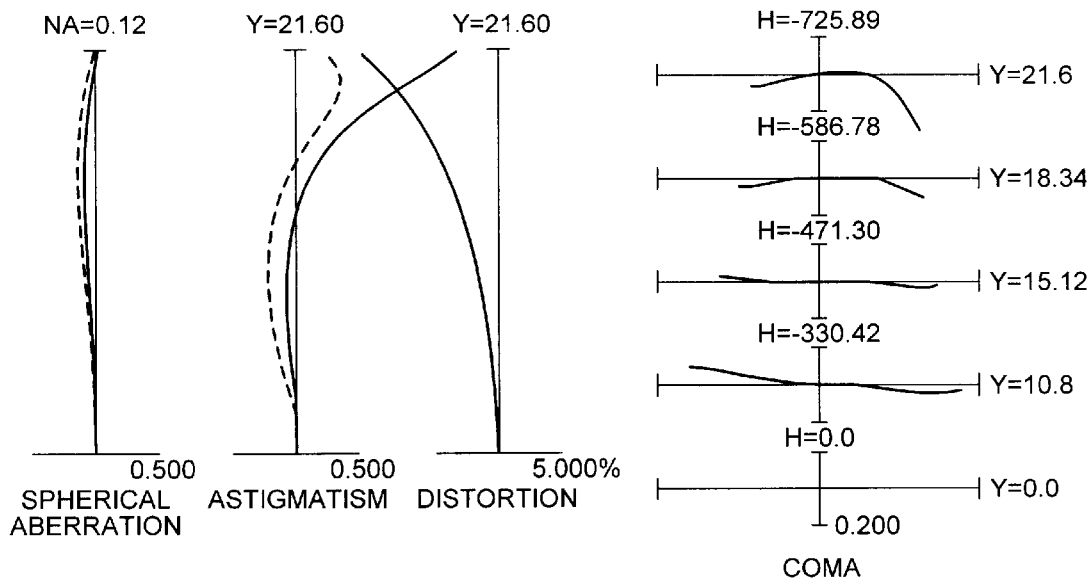
FIGS. 10A and 10B are graphs showing various aberrations in the wide-angle end state 10A and in the first intermediate focal length state 10B (focused at a near distant object) of the variable focal length lens system according to Example 2 of the present invention, respectively.
Figure 10B:
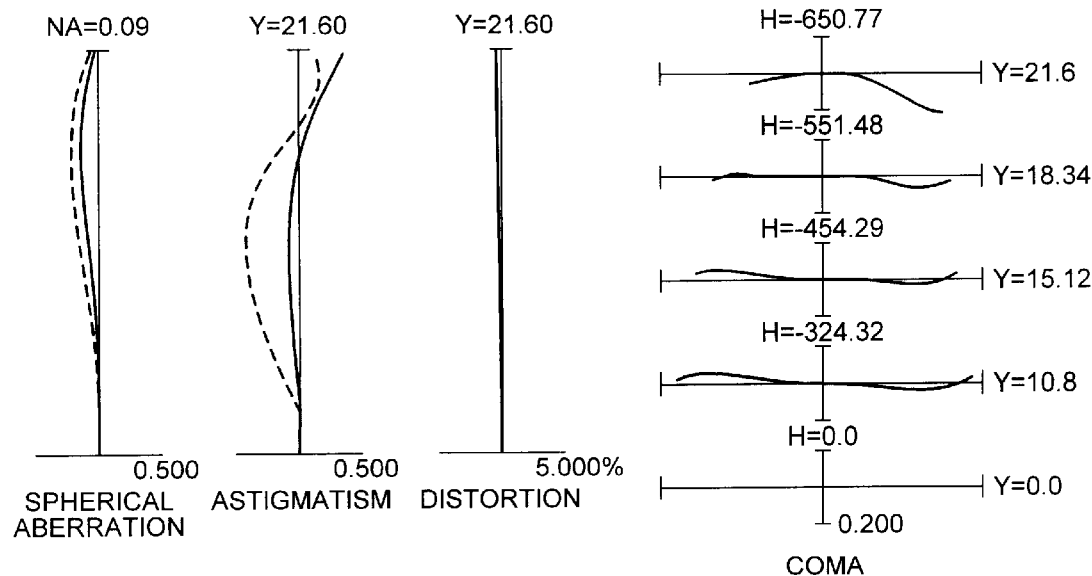
Figure 11A:
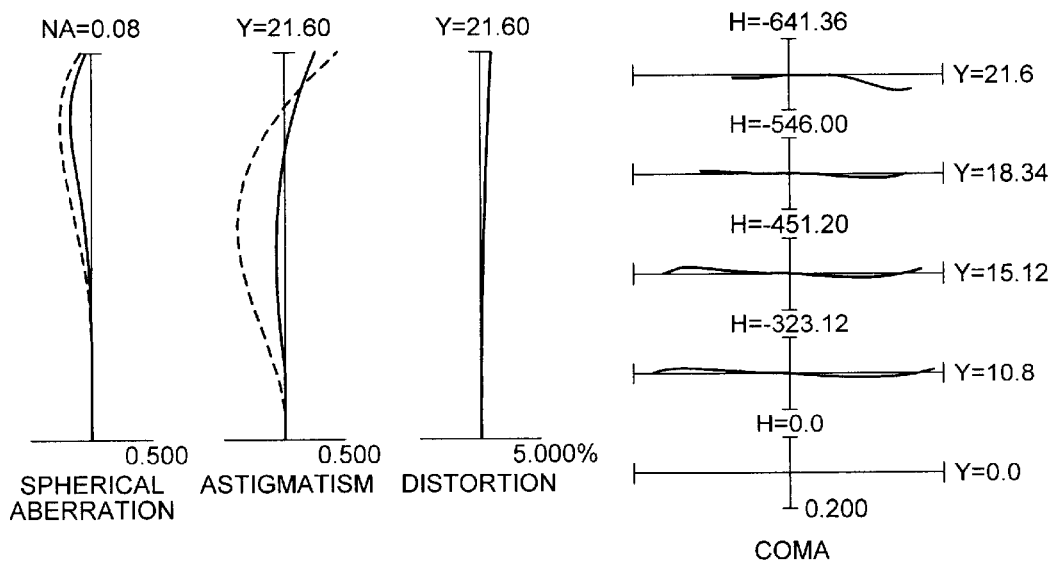
FIGS. 11A and 11B are graphs showing various aberrations in the second intermediate focal length state 11A and in the telephoto end state 11B (focused at a near distant object) of the variable focal length lens system according to Example 2 of the present invention, respectively.
Figure 11B:
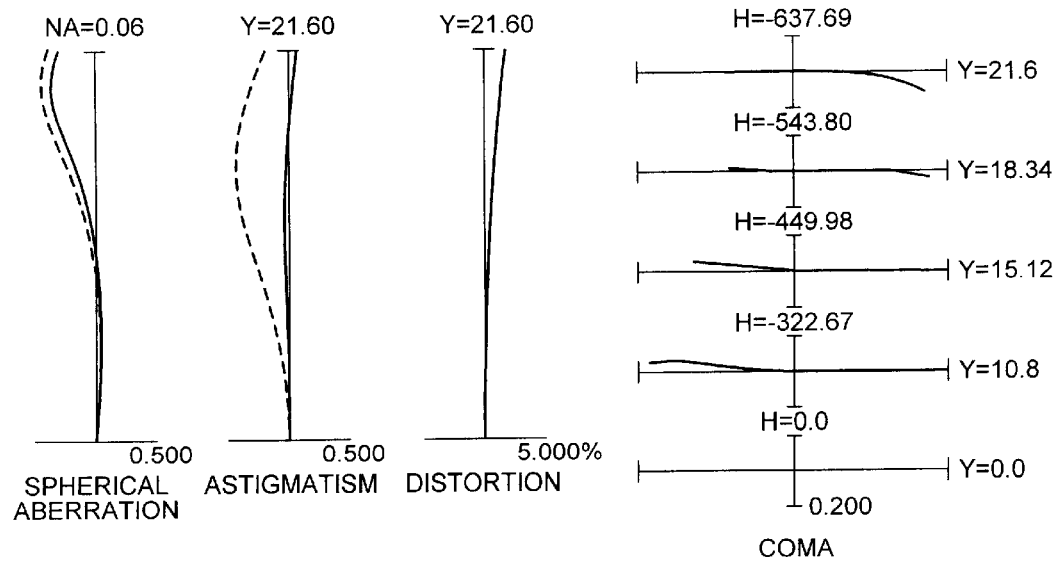

FIG. 7 is a sectional view schematically showing the configuration of a variable focal length lens system according to Example 2 of the present invention. The first lens group G1 is composed of a negative lens L11 having a concave surface facing to the object side and a double convex lens L12. The second lens group G2 is composed of a double concave lens L21 and a positive lens L22 having a convex surface facing to the object side. The third lens group G3 is composed of a positive cemented lens L3 composed of a negative meniscus lens having a convex surface facing to the object side and a double convex lens. The fourth lens group G4 is composed of a positive meniscus lens L41 having a convex surface facing to the image side and a negative meniscus lens L42 having a concave surface facing to the object side.

In this example, an aperture stop S is arranged to the object side of the third lens group G3, and is moved together with the third lens group G3 when the state of lens positions is changed.

Various values associated with Example 2 are listed in Table 2.

TABLE 2

| f   | 25.20~38.00~50.00~66.50 |
|-----|-------------------------|
| FNO | 4.10~5.46~6.45~7.98     |
| 2ω  | 83.23~58.52~45.83~35.21° |

| surface number | radius of curvature | surface distance | refractive index | Abbe number |
|----|----------|--------|---------|---------------|
| 1  | −134.8633 | 0.9000 | 1.84666 | 23.83 |
| 2  | 217.7687  | 0.1000 | 1.0     |       |
| 3  | 30.9343   | 2.1000 | 1.51823 | 58.96 |
| 4  | −286.2467 | (D4)   | 1.0     |       |
| 5  | −21.1047  | 0.8000 | 1.74330 | 49.23 |
| 6  | 16.5428   | 0.3000 | 1.0     |       |
| 7  | 12.5094   | 1.5000 | 1.76182 | 26.55 |
| 8  | 21.4485   | (D8)   | 1.0     |       |
| 9  | 0.0000    | 0.8500 | 1.0     | aperture stop |
| 10 | 13.6920   | 1.5000 | 1.92286 | 20.88 |
| 11 | 9.0803    | 4.2000 | 1.74330 | 49.23 |
| 12 | −19.8642  | (D12)  | 1.0     |       |
| 13 | −47.3887  | 3.5000 | 1.68893 | 31.16 |
| 14 | −22.3994  | 3.6500 | 1.0     |       |
| 15 | −9.9448   | 1.0000 | 1.80420 | 46.51 |
| 16 | −60.3571  | (Bf)   | 1.0     |       | aspherical coefficient

<surface number 5>

$\kappa = 1.000$     $C_4 = -8.6550 \times 10^{-5}$     $C_6 = +1.8608 \times 10^{-6}$
              $C_8 = -8.3570 \times 10^{-8}$     $C_{10} = +1.2265 \times 10^{-9}$ <surface number 12>

$\kappa = 5.2908$    $C_4 = +1.9201 \times 10^{-4}$     $C_6 = +1.8515 \times 10^{-6}$
              $C_8 = -1.1336 \times 10^{-8}$     $C_{10} = +3.3262 \times 10^{-10}$ <surface number 13>

$\kappa = -0.2248$   $C_4 = +1.2619 \times 10^{-4}$     $C_6 = +1.4326 \times 10^{-6}$
              $C_8 = -1.9855 \times 10^{-8}$     $C_{10} = -3.3942 \times 10^{-11}$ <surface number 14>

$\kappa = 1.0000$    $C_4 = +5.1695 \times 10^{-5}$     $C_6 = +1.6501 \times 10^{-6}$
              $C_8 = -3.3607 \times 10^{-10}$    $C_{10} = -1.9424 \times 10^{-10}$ TABLE 2-continued Variable intervals during zooming

| f | 25.2002 | 38.0005 | 50.0009 | 66.5016 |
|---|---|---|---|---|
| D4 | 2.7071 | 5.9253 | 9.2335 | 14.6653 |
| D8 | 2.8164 | 1.7739 | 1.1459 | 0.5125 |
| D12 | 9.1567 | 5.6792 | 4.0139 | 2.7371 |
| Bf | 7.3969 | 17.8411 | 26.5514 | 36.6863 | moving distance Δ2 of the second lens group G2 while focusing from infinity to near object (magnification = −1/30) where the movement toward object is assumed to be positive.

| f | 25.2002 | 38.0005 | 50.0009 | 66.5016 |
|---|---|---|---|---|
| Δ2 | 0.6797 | 0.4846 | 0.3974 | 0.3405 | values for the conditional expressions $f_1 = +118.422$
$f_2 = -18.182$
$f_3 = +12.542$
$f_4 = -20.941$
$f_{2N} = -12.364$
$f_{2P} = +36.734$
(1) $f_1/f_w = 4.699$
(2) $|f_2|/(f_w \cdot f_t)^{1/2} = 0.444$
(3) $f_w/|r_a| = 0.187$
(4) $f_w/|r_b| = 1.194$
(5) $(r_c + r_d)/f_w = 1.153$
(6) $D1/D3 = 1.863$
(7) $|f_4|/f_1 = 0.177$
(8) $f_1/(f_w \cdot f_t)^{1/2} = 2.893$
(9) $DW23/f_w = 0.215$
(10) $(|f_{2N}| + f_{2P})/f_w = 1.948$
(11) $(|f_2| + f_3)/f_w = 1.219$
(12) $|f_4|/f_t = 0.315$ FIGS. 8A, 8B, 9A, and 9B are graphs showing various aberrations in a state focused at infinity in a wide-angle end state (f=25.20), a first intermediate focal length state (f=38.00), a second intermediate focal length state (f=50.00), and a telephoto end state (f=66.50) of the variable focal length lens system according to Example 2 of the present invention, respectively.

FIGS. 10A, 10B, 11A, and 11B are graphs showing various aberrations in a state focused at a near object (magnification: −1/30) in the wide-angle end state (f=25.20), the first intermediate focal length state (f=38.00), the second intermediate focal length state (f=50.00), and the telephoto end state (f=66.50) of the variable focal length lens system according to Example 2 of the present invention, respectively.

As apparent from the respective diagrams showing various aberrations, excellent compensation is made for the various aberrations at the respective image distances and at the respective focal lengths.

EXAMPLE 3

Figure 12:
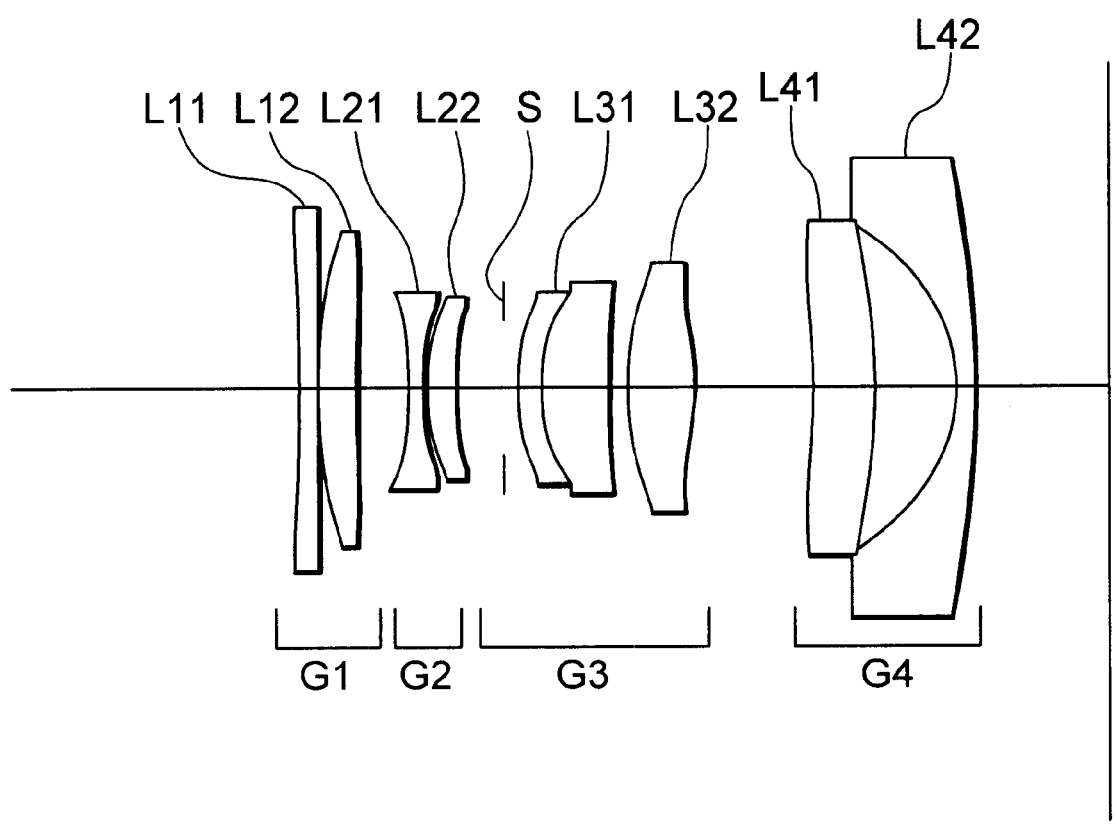
FIG. 12 is a sectional view schematically showing the configuration of a variable focal length lens system according to Example 3 of the present invention.
Figure 13A:
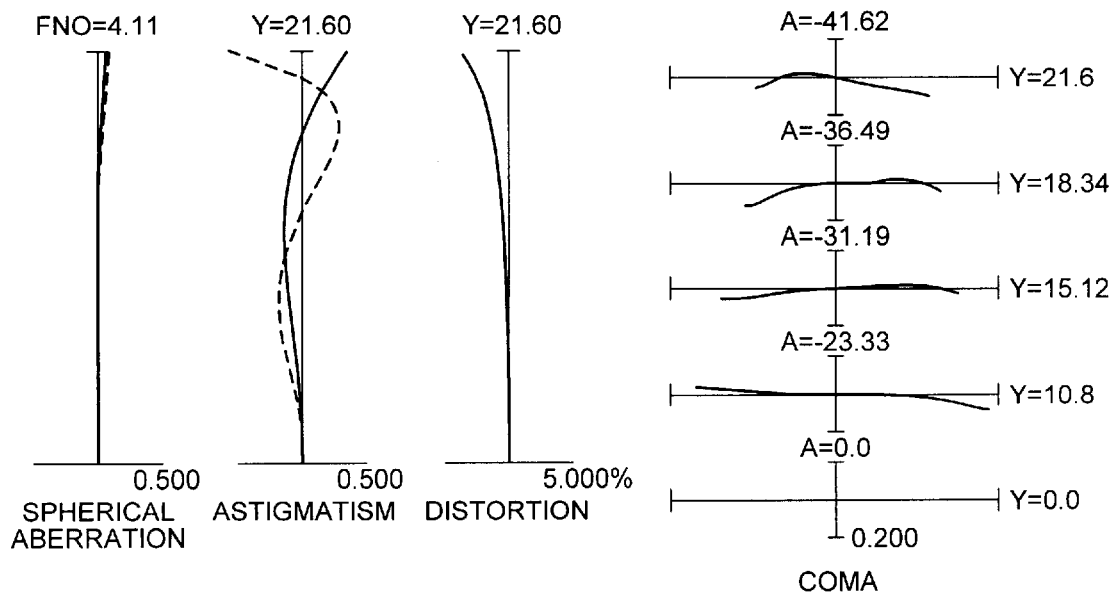
FIGS. 13A and 13B are graphs showing various aberrations in a wide-angle end state 13A and in a first intermediate focal length state 13B (focused at infinity) of the variable focal length lens system according to Example 3 of the present invention, respectively.
Figure 13B:
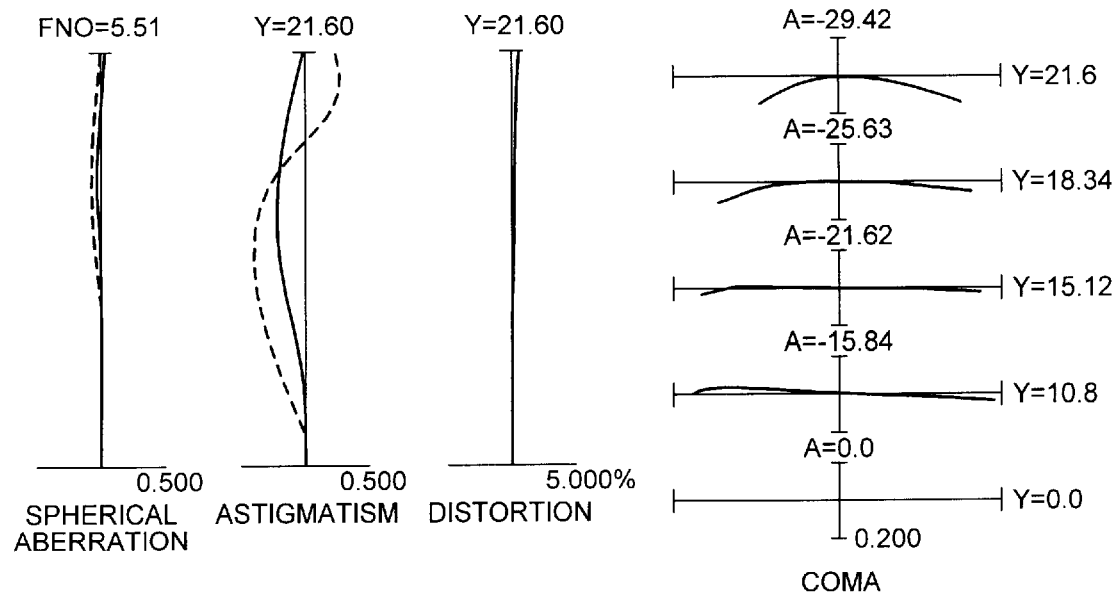
Figure 14A:
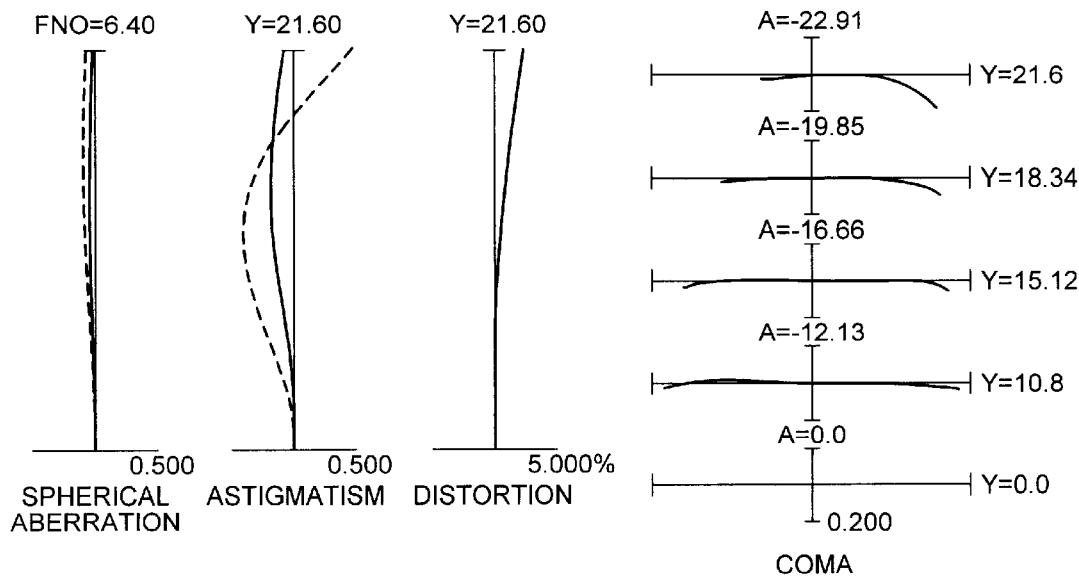
FIGS. 14A and 14B are graphs showing various aberrations in a second intermediate focal length state 14A and in a telephoto end state 14B (focused at infinity) of the variable focal length lens system according to Example 3 of the present invention, respectively.
Figure 14B:
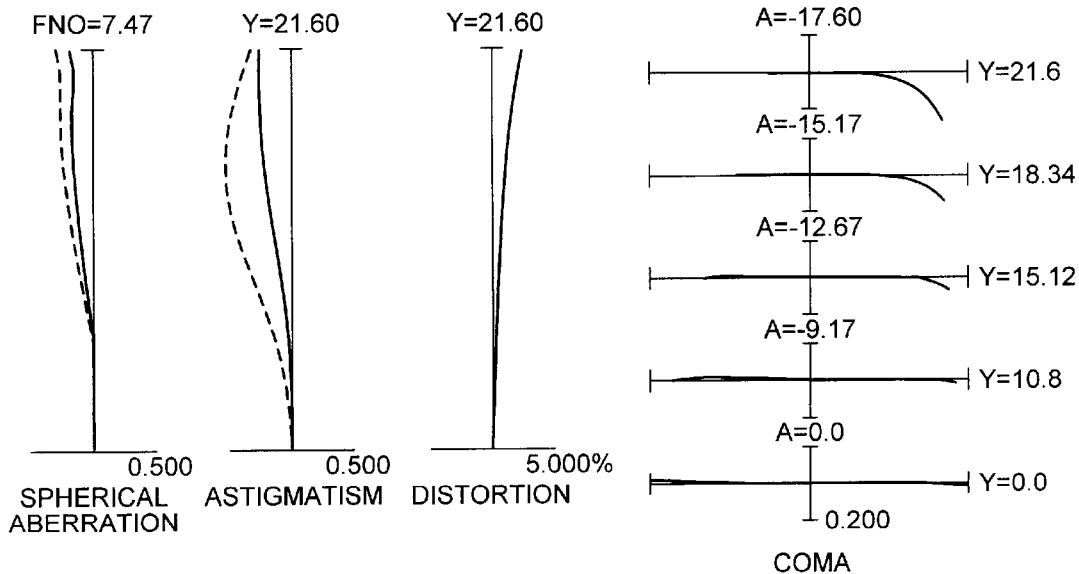
Figure 15A:
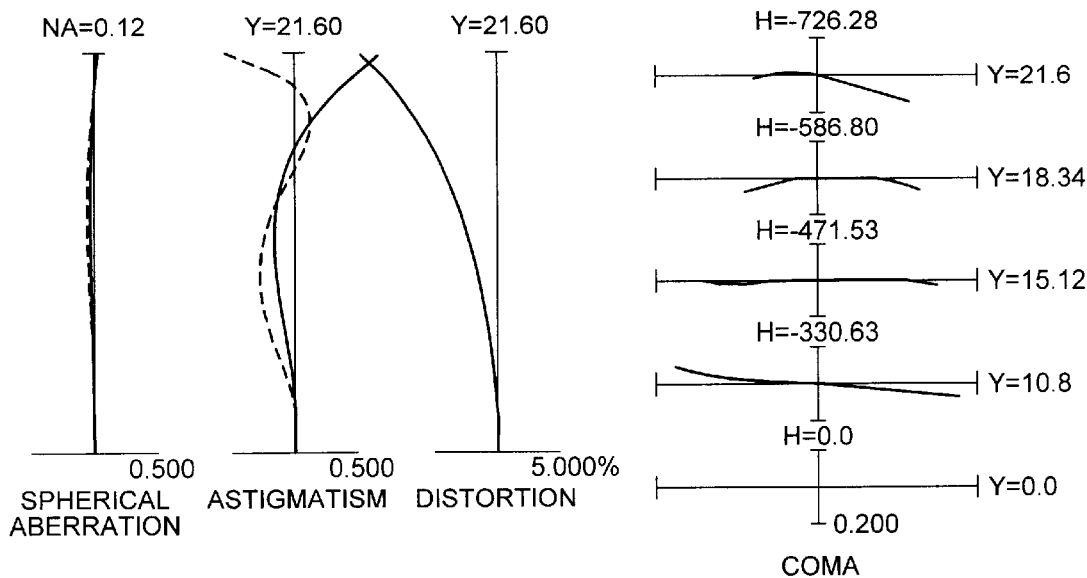
FIGS. 15A and 15B are graphs showing various aberrations in the wide-angle end state 15A and in the first intermediate focal length state 15B (focused at a near distant object) of the variable focal length lens system according to Example 3 of the present invention, respectively.
Figure 15B:
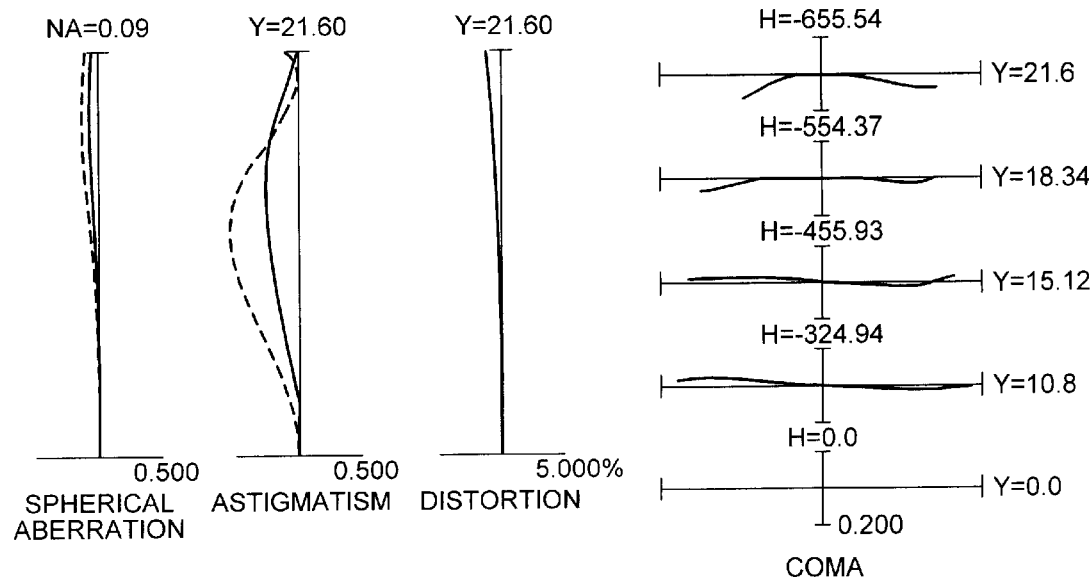
Figure 16A:
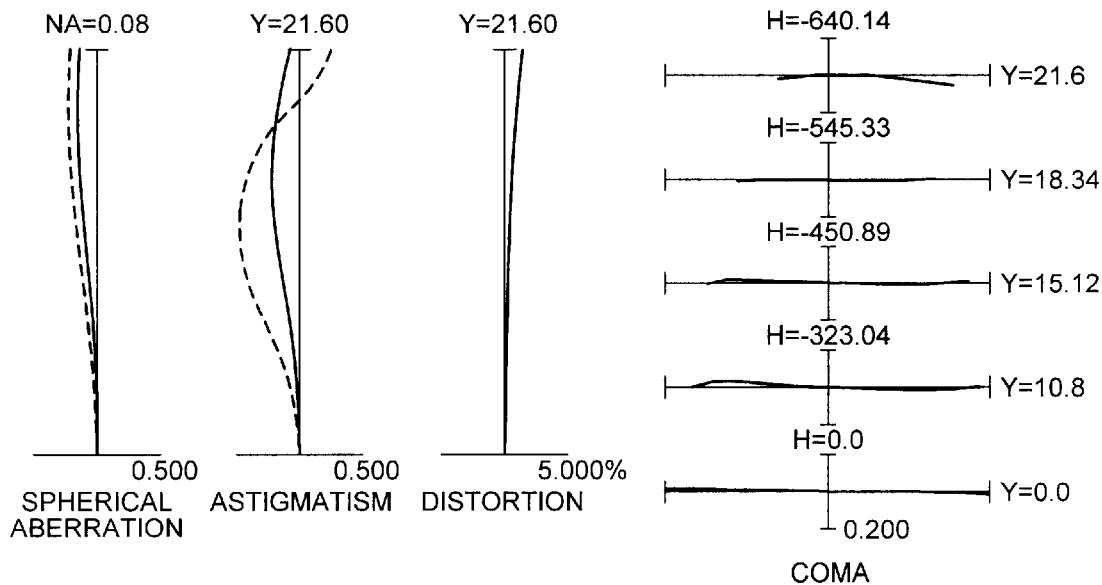
FIGS. 16A and 16B are graphs showing various aberrations in the second intermediate focal length state 16A and in the telephoto end state 16B (focused at a near distant object) of the variable focal length lens system according to Example 3 of the present invention, respectively.
Figure 16B:
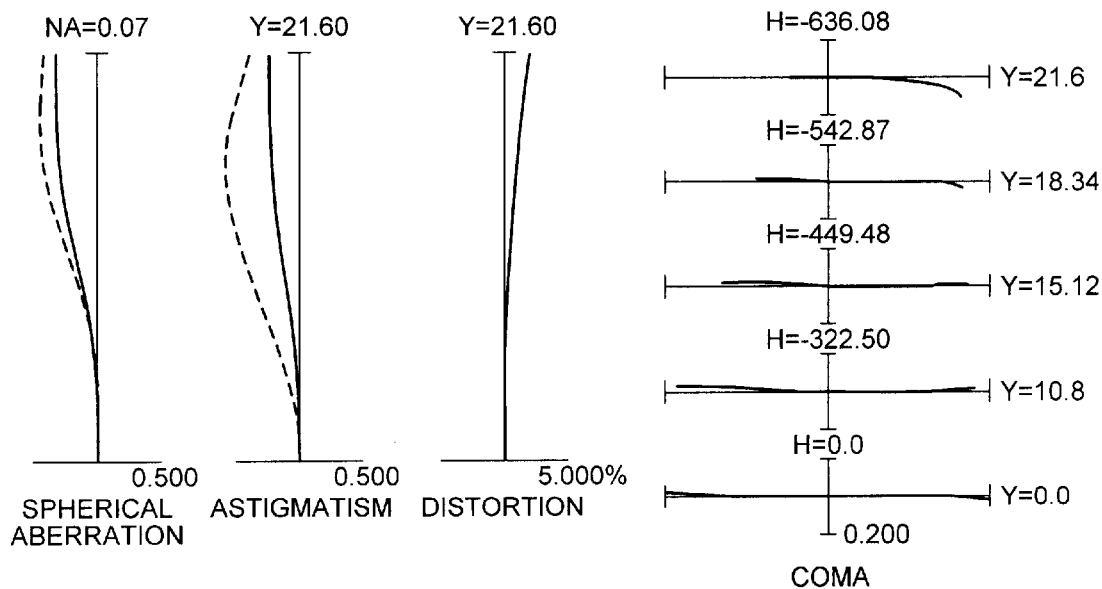

FIG. 12 is a sectional view schematically showing the configuration of a variable focal length lens system according to Example 3 of the present invention. The first lens group G1 is composed of a negative lens L11 having a concave surface facing to the object side and a double convex lens L12. The second lens group G2 is composed of a double concave lens L21 and a positive lens L22 having a convex surface facing to the object side. The third lens group G3 is composed of a positive cemented lens L31 composed of a negative meniscus lens having a convex surface facing to the object side and a positive meniscus lens having a convex surface facing to the object side, and a double convex lens L32. The fourth lens group G4 is composed of a positive meniscus lens L41 having a convex surface facing to the image side and a negative meniscus lens L42 having a concave surface facing to the object side.

In this example, an aperture stop S is arranged to the object side of the third lens group G3, and is moved together with the third lens group G3 when the state of lens positions is changed.

Various values associated with Example 3 are listed in Table 3.

TABLE 3

| f | 25.20~38.00~50.00~66.50 |
|---|---|
| FNO | 4.10~5.46~6.45~7.98 |
| 2ω | 83.23~58.52~45.83~35.21° |

| surface number | radius of curvature | surface distance | refractive index | Abbe number |
|---|---|---|---|---|
| 1 | −191.8003 | 0.9000 | 1.84666 | 23.83 |
| 2 | 173.9809 | 0.1000 | 1.0 | |
| 3 | 28.8730 | 2.1500 | 1.51680 | 64.20 |
| 4 | −350.7640 | (D4) | 1.0 | |
| 5 | −21.2590 | 0.8000 | 1.74330 | 49.23 |
| 6 | 13.1632 | 0.4000 | 1.0 | |
| 7 | 12.7103 | 1.5000 | 1.80518 | 25.46 |
| 8 | 28.4844 | (D8) | 1.0 | |
| 9 | 0.0000 | 0.8500 | 1.0 | aperture stop |
| 10 | 13.6986 | 1.1000 | 1.84666 | 23.83 |
| 11 | 8.6695 | 3.7000 | 1.75500 | 52.32 |
| 12 | 68.0090 | 0.9000 | 1.0 | |
| 13 | 18.3120 | 3.3000 | 1.51680 | 64.20 |
| 14 | −23.2702 | (D12) | 1.0 | |
| 15 | −49.3211 | 3.2000 | 1.68893 | 31.16 |
| 16 | −32.8496 | 4.3500 | 1.0 | |
| 17 | −9.7623 | 1.0000 | 1.75500 | 52.32 |
| 18 | −58.5399 | (Bf) | 1.0 | | aspherical coefficient

<surface number 5>

$\kappa = 1.0000$ $C_4 = -3.4545 \times 10^{-5}$ $C_6 = +7.2090 \times 10^{-7}$
$C_8 = -5.6478 \times 10^{-8}$ $C_{10} = +1.1608 \times 10^{-9}$ <surface number 14>

$\kappa = 1.0000$ $C_4 = +2.3931 \times 10^{-4}$ $C_6 = +1.0889 \times 10^{-6}$
$C_8 = -2.4407 \times 10^{-8}$ $C_{10} = +2.6165 \times 10^{-10}$ <surface number 15>

$\kappa = 0.7729$ $C_4 = +1.3340 \times 10^{-4}$ $C_6 = +1.7026 \times 10^{-6}$
$C_8 = -3.3442 \times 10^{-8}$ $C_{10} = +6.8392 \times 10^{-11}$ <surface number 16>

$\kappa = 1.0000$ $C_4 = +4.2502 \times 10^{-5}$ $C_6 = +2.1853 \times 10^{-6}$
$C_8 = -1.5369 \times 10^{-10}$ $C_{10} = -1.1296 \times 10^{-10}$ Variable intervals during zooming

| f | 25.2001 | 38.0002 | 50.0004 | 66.5007 |
|---|---|---|---|---|
| D4 | 2.6525 | 6.0056 | 9.9292 | 14.5172 |
| D8 | 2.2903 | 1.6467 | 0.9749 | 0.4000 |
| D14 | 6.3018 | 3.0283 | 1.7553 | 0.6000 |
| Bf | 7.3825 | 17.7782 | 25.4696 | 35.2332 | moving distance Δ2 of the second lens group G2 while focusing from infinity to near object (magnification = −1/30) where the movement toward object is assumed to be positive.

| f | 25.2001 | 38.0002 | 50.0004 | 66.5007 |
|---|---|---|---|---|
| Δ2 | 0.7256 | 0.5300 | 0.4930 | 0.3944 | values for the conditional expressions $f_1 = +98.786$
$f_2 = -17.857$
$f_3 = +12.475$
$f_4 = -17.870$
$f_{2N} = -10.830$
$f_{2P} = +27.345$ TABLE 3-continued (1) $f_1/f_w = 0.436$
(2) $|f_2|/(f_w \cdot f_t)^{1/2} = 0.436$
(3) $f_w/|r_a| = 0.131$
(4) $f_w/|r_b| = 1.185$
(5) $(r_c + r_d)/f_w = 1.027$
(6) D1/D3 = 2.081
(7) $|f_4|/f_1 = 0.181$
(8) $f_1/(f_w \cdot f_t)^{1/2} = 2.413$
(9) $DW23/f_w = 0.198$
(10) $(|f_{2N}| + f_{2P})/f_w = 1.515$
(11) $(|f_2| + f_3)/f_w = 1.204$
(12) $|f_4|/f_t = 0.269$ FIGS. 13A, 13B, 14A, and 14B are graphs showing various aberrations in a state focused at infinity in a wide-angle end state (f=25.20), a first intermediate focal length state (f=38.00), a second intermediate focal length state (f=50.00), and a telephoto end state (f=66.50) of the variable focal length lens system according to Example 3 of the present invention, respectively.

FIGS. 15A, 15B, 16A, and 16B are graphs showing various aberrations in a state focused at a near object (magnification: −1/30) in the wide-angle end state (f=25.20), the first intermediate focal length state (f=38.00), the second intermediate focal length state (f=50.00), and the telephoto end state (f=66.50) of the variable focal length lens system according to Example 3 of the present invention, respectively.

As apparent from the respective diagrams showing various aberrations, excellent compensation is made for the various aberrations at the respective image distances and at the respective focal lengths.

EXAMPLE 4

Figure 17:
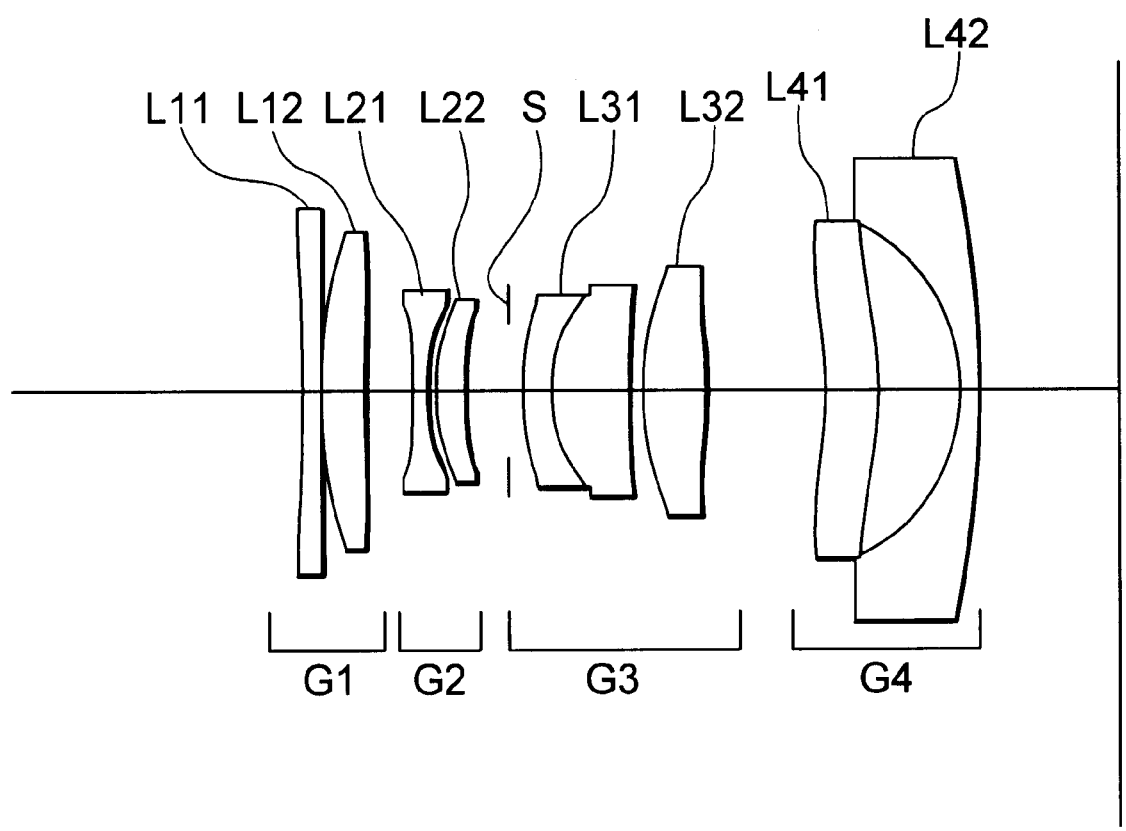
FIG. 17 is a sectional view schematically showing the configuration of a variable focal length lens system according to Example 4 of the present invention.
Figure 18A:
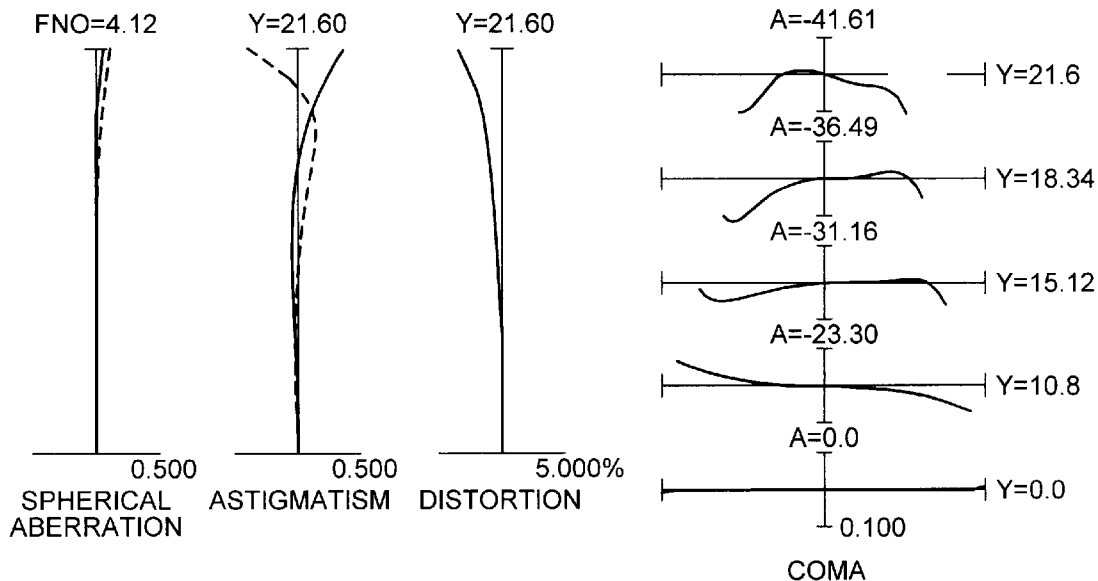
FIGS. 18A and 18B are graphs showing various aberrations in a wide-angle end state 18A and in a first intermediate focal length state 18B (focused at infinity) of the variable focal length lens system according to Example 4 of the present invention, respectively.
Figure 18B:
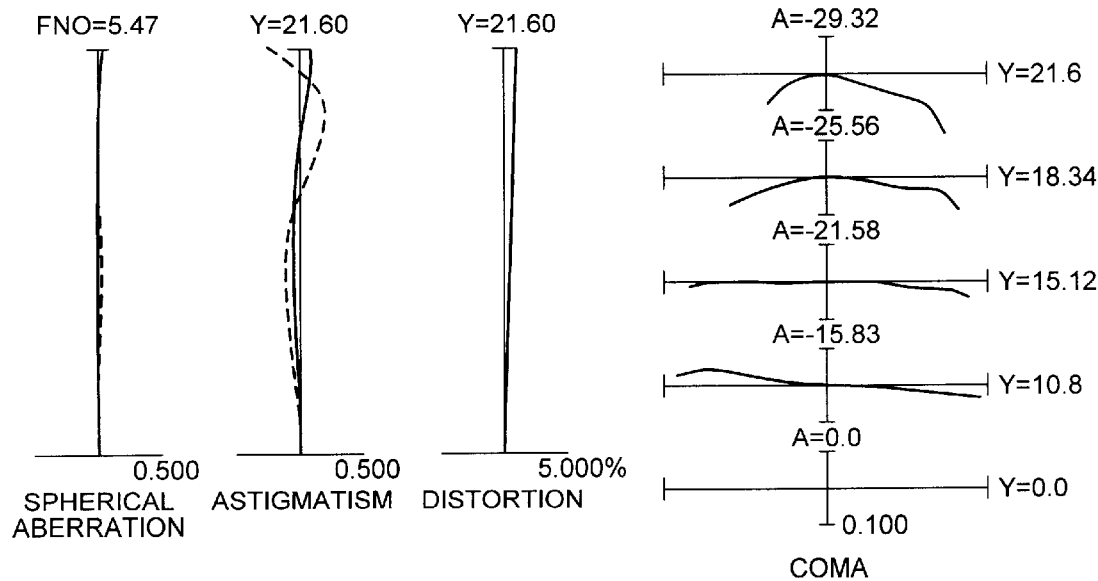
Figure 19A:
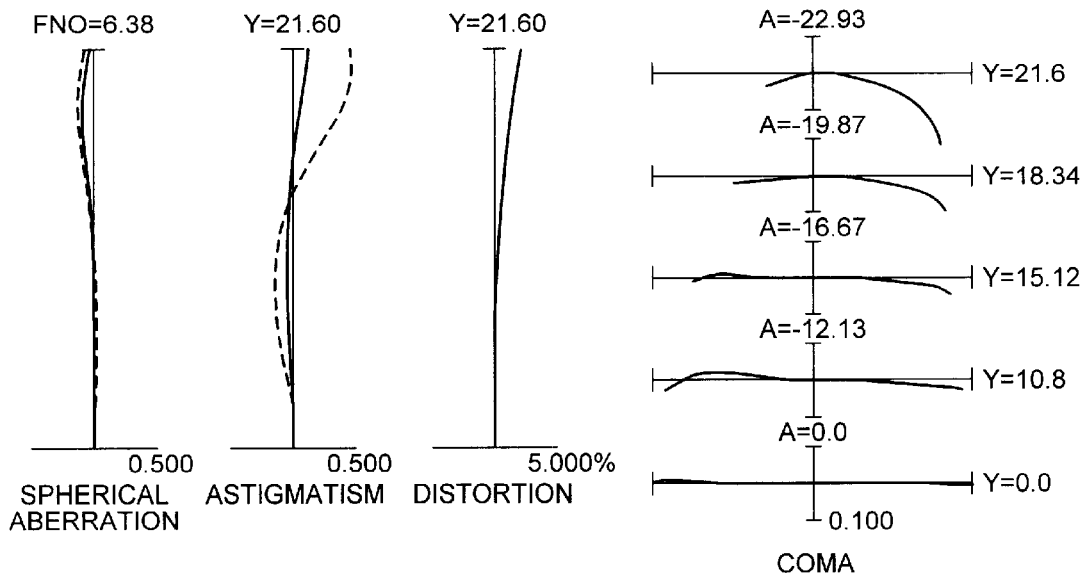
FIGS. 19A and 19B are graphs showing various aberrations in a second intermediate focal length state 19A and in a telephoto end state 19B (focused at infinity) of the variable focal length lens system according to Example 4 of the present invention, respectively.
Figure 19B:
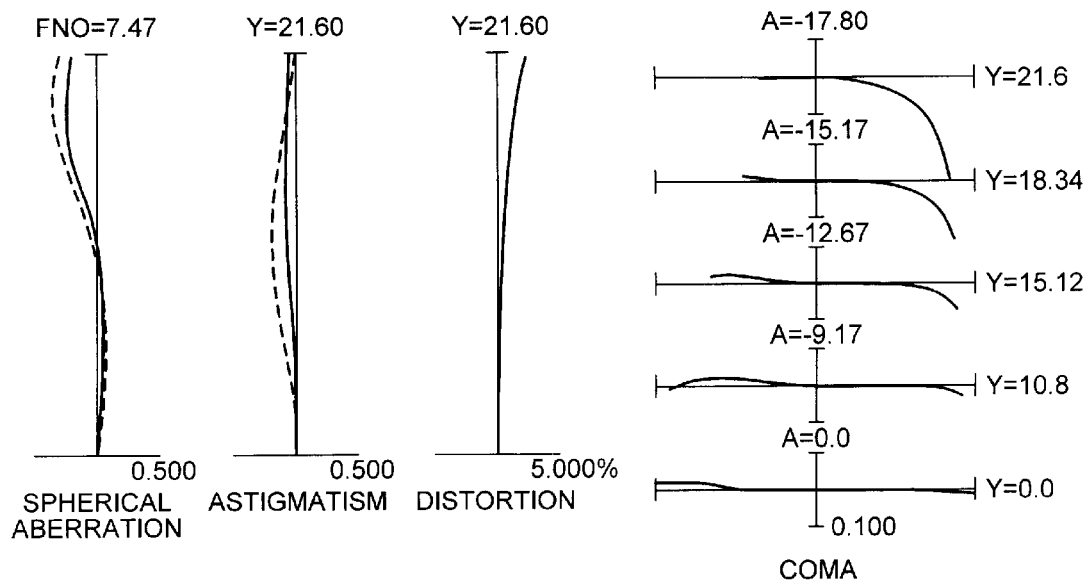
Figure 20A:
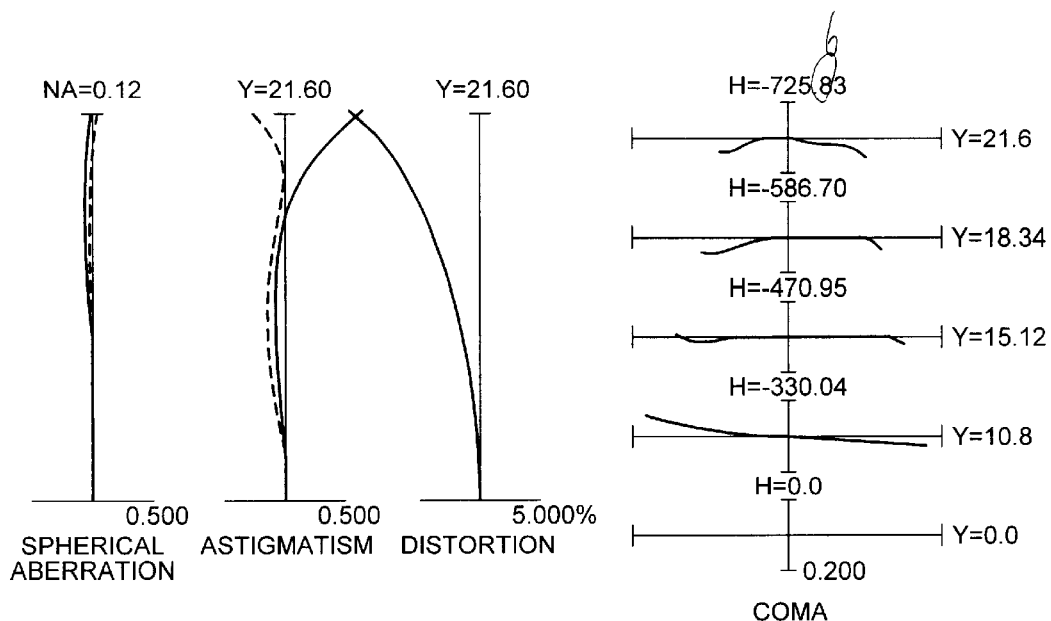
FIGS. 20A and 20B are graphs showing various aberrations in the wide-angle end state 20A and in the first intermediate focal length state 20B (focused at a near distant object) of the variable focal length lens system according to Example 4 of the present invention, respectively.
Figure 20B:
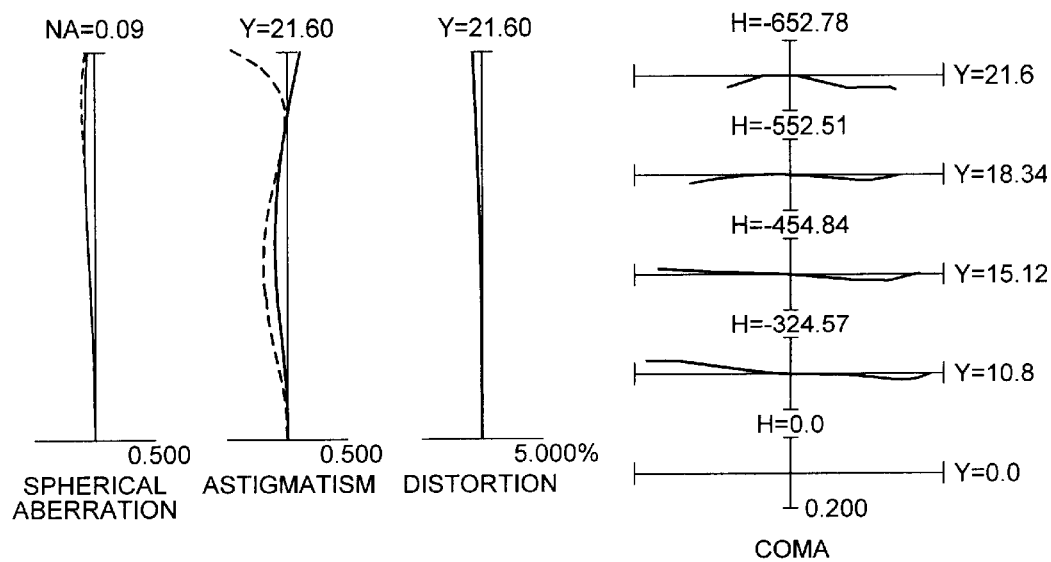
Figure 21A:
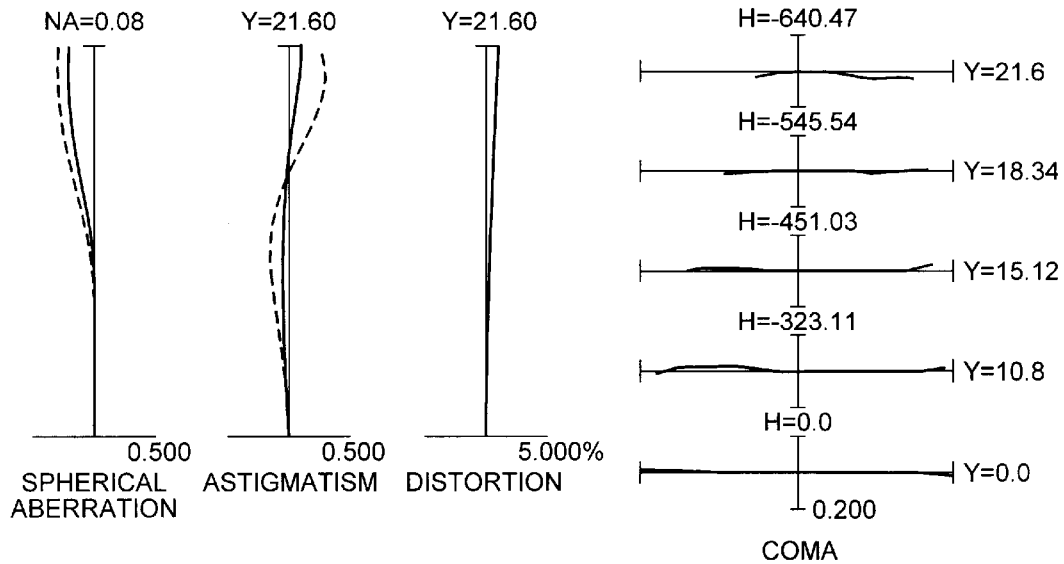
FIGS. 21A and 21B are graphs showing various aberrations in the second intermediate focal length state 21A and in the telephoto end state 21B (focused at a near distant object) of the variable focal length lens system according to Example 4 of the present invention, respectively.
Figure 21B:
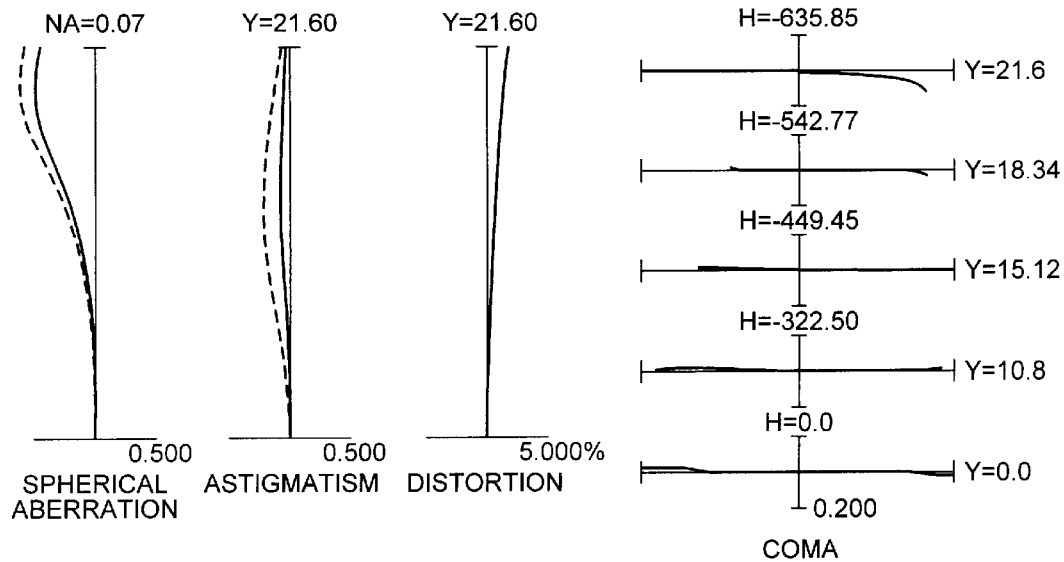

FIG. 17 is a sectional view schematically showing the configuration of a variable focal length lens system according to Example 4 of the present invention. The first lens group G1 is composed of a negative lens L11 having a concave surface facing to the object side and a double convex lens L12. The second lens group G2 is composed of a double concave lens L21 and a positive lens L22 having a convex surface facing to the object side. The third lens group G3 is composed of a positive cemented lens L31 composed of a negative meniscus lens having a convex surface facing to the object side and a positive meniscus lens having a convex surface facing to the object side, and a double convex lens L32. The fourth lens group G4 is composed of a positive meniscus lens L41 having a convex surface facing to the image side and a negative meniscus lens L42 having a concave surface facing to the object side.

In this example, an aperture stop S is arranged to the object side of the third lens group G3, and is moved together with the third lens group G3 when the state of lens positions is changed.

Various values associated with Example 4 are listed in Table 4.

TABLE 4

| f | 25.20~38.00~50.00~66.50 |
|---|---|
| FNO | 4.10~5.46~6.39~7.50 |
| 2ω | 83.23~58.65~45.86~35.21° |

| surface number | radius of curvature | surface distance | refractive index | Abbe number |
|---|---|---|---|---|
| 1 | −348.2231 | 0.9000 | 1.84666 | 23.83 |
| 2 | 99.6503 | 0.1000 | 1.0 | |
| 3 | 27.0051 | 2.2500 | 1.51680 | 64.20 |
| 4 | −236.9442 | (D4) | 1.0 | |
| 5 | −22.0736 | 0.8000 | 1.74330 | 49.23 |
| 6 | 12.4558 | 0.4500 | 1.0 | |
| 7 | 12.6126 | 1.5000 | 1.80518 | 25.46 |
| 8 | 29.9444 | (D8) | 1.0 | |
| 9 | 0.0000 | 0.8500 | 1.0 | aperture stop |
| 10 | 13.6986 | 1.5000 | 1.76182 | 26.55 |
| 11 | 7.8645 | 4.0000 | 1.75500 | 52.32 |
| 12 | 41.6270 | 0.9000 | 1.0 | |
| 13 | 16.2878 | 3.3000 | 1.51680 | 64.20 |
| 14 | −21.2845 | (D12) | 1.0 | |
| 15 | −28.5714 | 2.6000 | 1.68893 | 31.16 |
| 16 | −24.2733 | 4.4500 | 1.0 | |
| 17 | −9.7033 | 1.0000 | 1.75500 | 52.32 |
| 18 | −53.0382 | (Bf) | 1.0 | | aspherical coefficient

<surface number 5>

$\kappa = 1.0000$    $C_4 = -2.8008 \times 10^{-5}$    $C_6 = +7.4144 \times 10^{-7}$
$C_8 = -7.0982 \times 10^{-8}$    $C_{10} = +1.5777 \times 10^{-9}$ <surface number 14>

$\kappa = 1.0000$    $C_4 = +2.9057 \times 10^{-4}$    $C_6 = +7.6385 \times 10^{-8}$
$C_8 = +2.1196 \times 10^{-8}$    $C_{10} = -2.1511 \times 10^{-10}$ <surface number 15>

$\kappa = -4.0000$    $C_4 = +1.1526 \times 10^{-4}$    $C_6 = +3.1332 \times 10^{-6}$
$C_8 = -3.3442 \times 10^{-8}$    $C_{10} = +3.6081 \times 10^{-10}$ <surface number 16>

$\kappa = 1.0000$    $C_4 = +3.8229 \times 10^{-5}$    $C_6 = +3.3205 \times 10^{-6}$
$C_8 = -4.1121 \times 10^{-8}$    $C_{10} = +1.0853 \times 10^{-10}$ Variable intervals during zooming

| f | 25.1996 | 37.9990 | 49.9976 | 66.4955 |
|---|---|---|---|---|
| D4 | 2.6181 | 5.9393 | 9.2998 | 13.0948 |
| D8 | 2.0702 | 1.4874 | 0.9949 | 0.4000 |
| D14 | 6.1747 | 3.0507 | 1.6591 | 0.6000 |
| Bf | 7.3743 | 17.7474 | 26.0941 | 36.3017 | moving distance Δ2 of the second lens group G2 while focusing from infinity to near object (magnification = −1/30) where the movement toward object is assumed to be positive

| f | 25.1996 | 37.9990 | 49.9976 | 66.4955 |
|---|---|---|---|---|
| Δ2 | 0.7464 | 0.5469 | 0.4616 | 0.3934 | values for the conditional expressions $f_1 = +96.131$
$f_2 = -17.928$
$f_3 = +12.391$
$f_4 = -17.092$
$f_{2N} = -10.608$
$f_{2P} = +26.058$
(1) $f_1/f_w = 3.815$
(2) $|f_2|/(f_w \cdot f_t)^{1/2} = 0.438$
(3) $f_w/|r_a| = 0.072$
(4) $f_w/|r_b| = 1.142$
(5) $(r_c + r_d)/f_w = 0.995$
(6) D1/D3 = 1.879
(7) $|f_4|/f_1 = 0.178$
(8) $f_1/(f_w \cdot f_t)^{1/2} = 2.348$
(9) $DW23/f_w = 0.191$
(10) $(|f_{2N}| + f_{2P})/f_w = 1.455$
(11) $(|f_2| + f_3)/f_w = 1.203$
(12) $|f_4|/f_t = 0.257$ FIGS. 18A, 18B, 19A, and 19B are graphs showing various aberrations in a state focused at infinity in a wide-angle end state (f=25.20), a first intermediate focal length state (f=38.00), a second intermediate focal length state (f=50.00), and a telephoto end state (f=66.50) of the variable focal length lens system according to Example 4 of the present invention, respectively.

FIGS. 20A, 20B, 21A, and 21B are graphs showing various aberrations in a state focused at a near object (magnification: −1/30) in the wide-angle end state (f=25.20), the first intermediate focal length state (f=38.00), the second intermediate focal length state (f=50.00), and the telephoto end state (f=66.50) of the variable focal length lens system according to Example 4 of the present invention, respectively.

As apparent from the respective diagrams showing various aberrations, excellent compensation is made for the various aberrations at the respective image distances and at the respective focal lengths.

EXAMPLE 5

Figure 22:
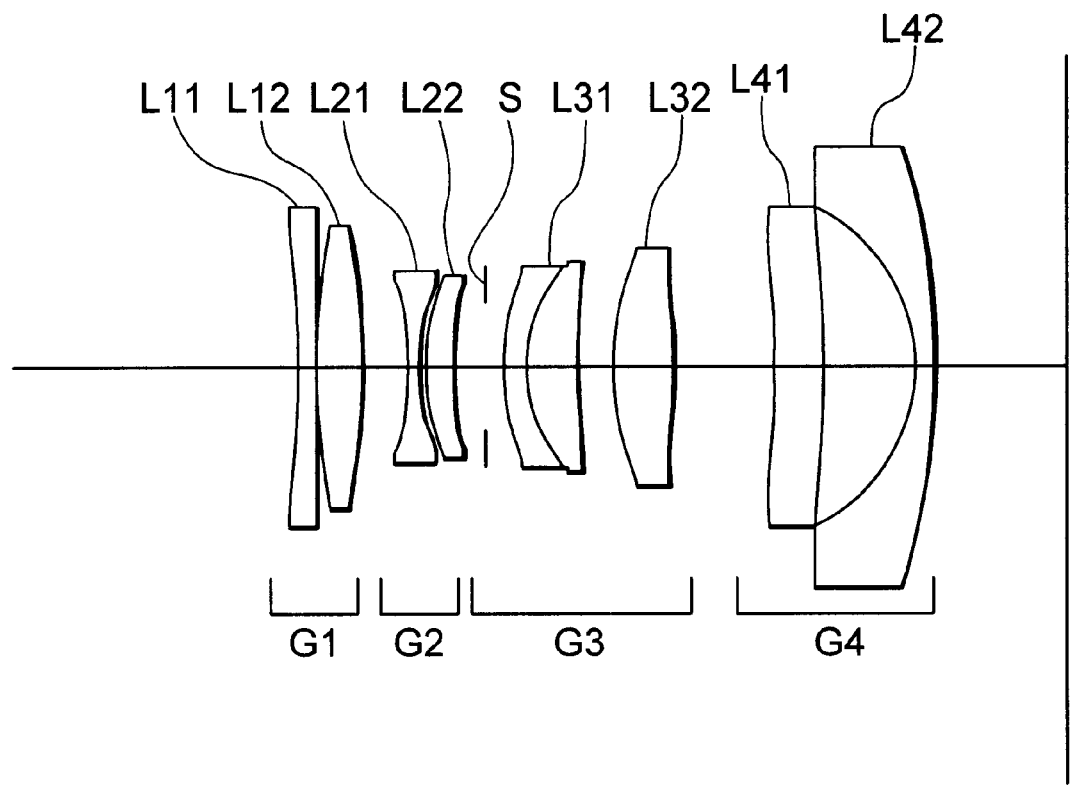
FIG. 22 is a sectional view schematically showing the configuration of a variable focal length lens system according to Example 5 of the present invention.
Figure 23A:
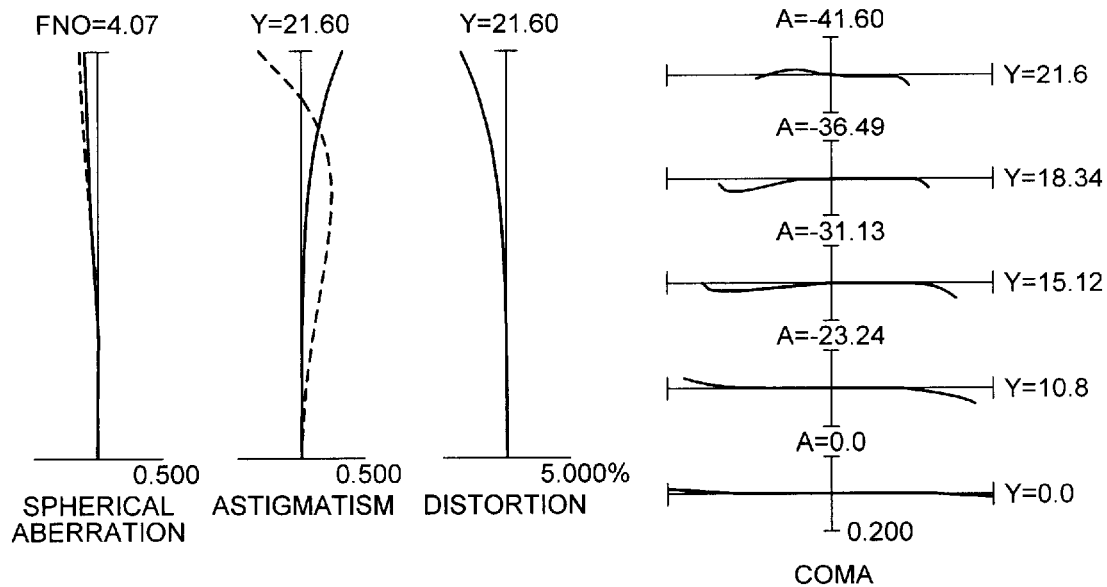
FIGS. 23A and 23B are graphs showing various aberrations in a wide-angle end state 23A and in a first intermediate focal length state 23B (focused at infinity) of the variable focal length lens system according to Example 5 of the present invention, respectively.
Figure 23B:
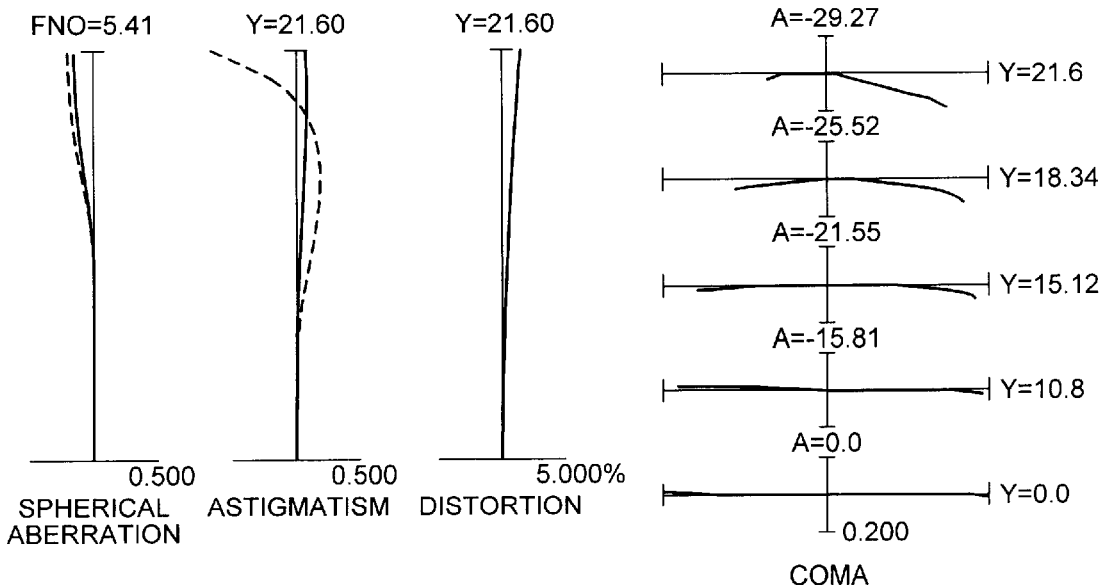
Figure 24A:
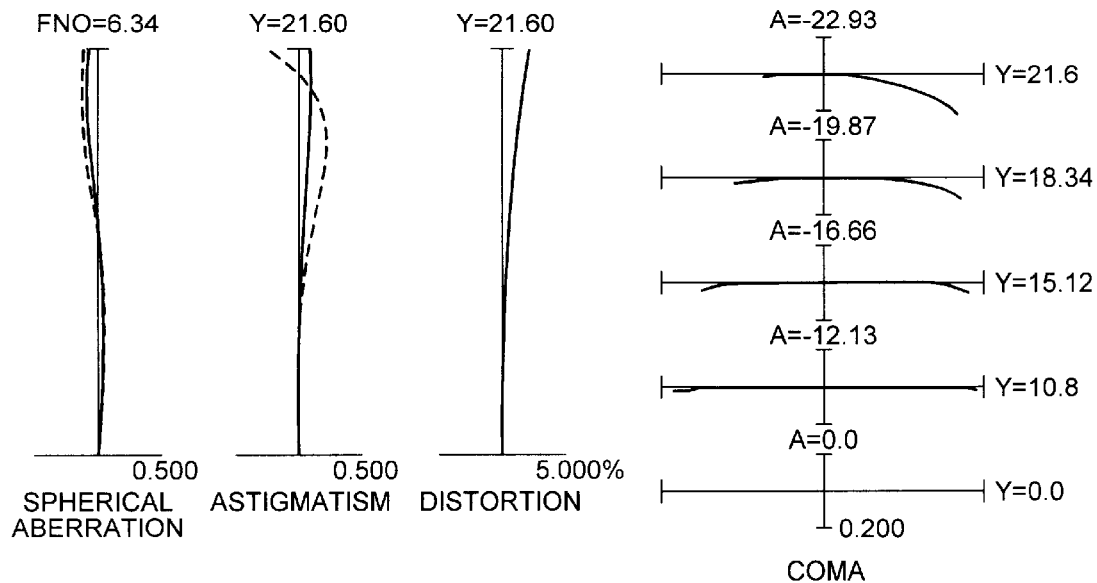
FIGS. 24A and 24B are graphs showing various aberrations in a second intermediate focal length state 24A and in a telephoto end state 24B (focused at infinity) of the variable focal length lens system according to Example 5 of the present invention, respectively.
Figure 24B:
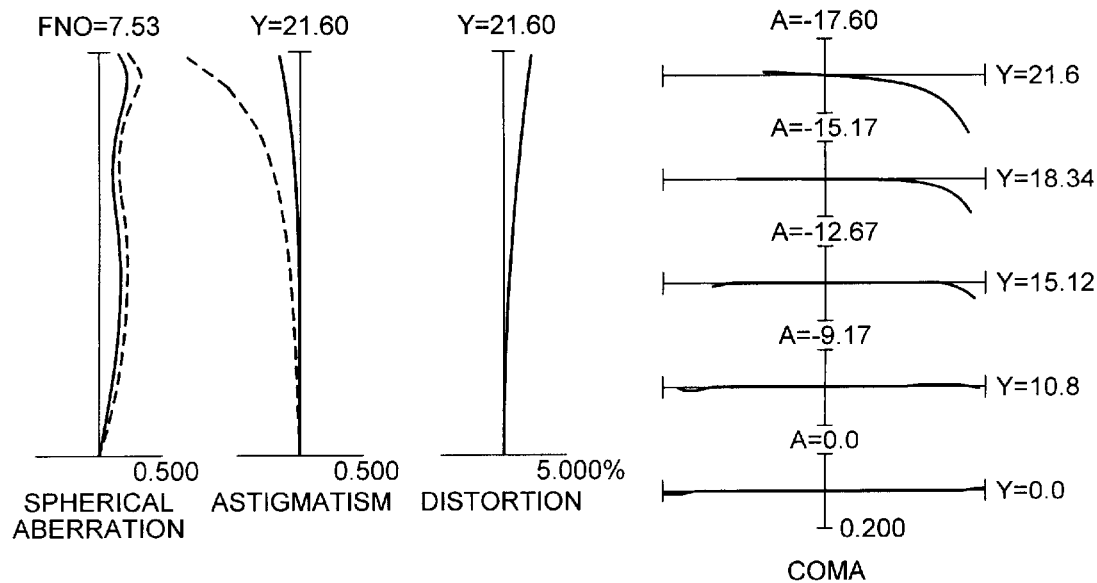
Figure 25A:
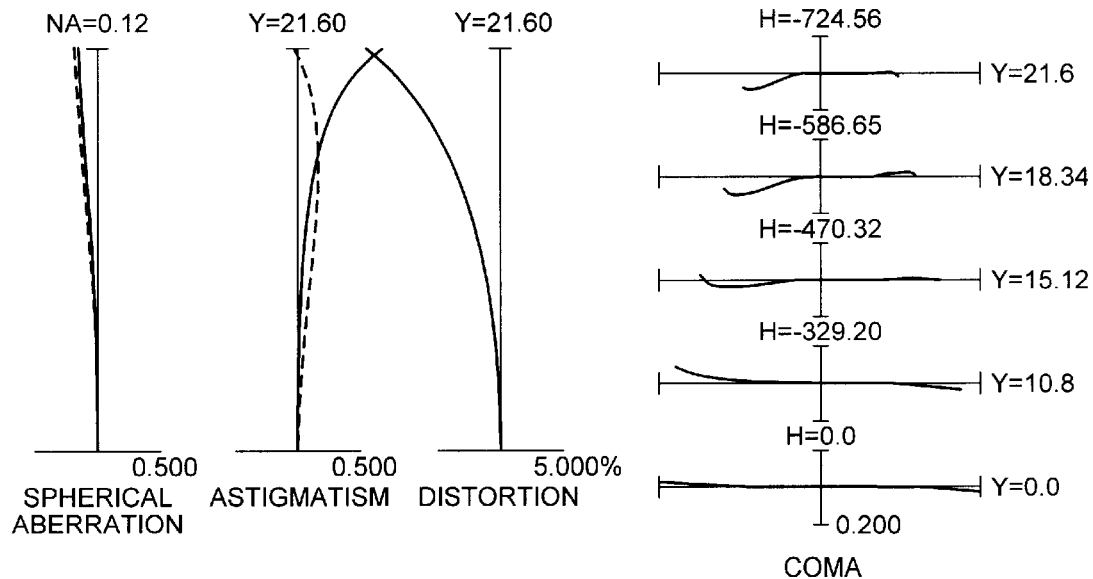
FIGS. 25A and 25B are graphs showing various aberrations in the wide-angle end state 25A and in the first intermediate focal length state 25B (focused at a near distant object) of the variable focal length lens system according to Example 5 of the present invention, respectively.
Figure 25B:
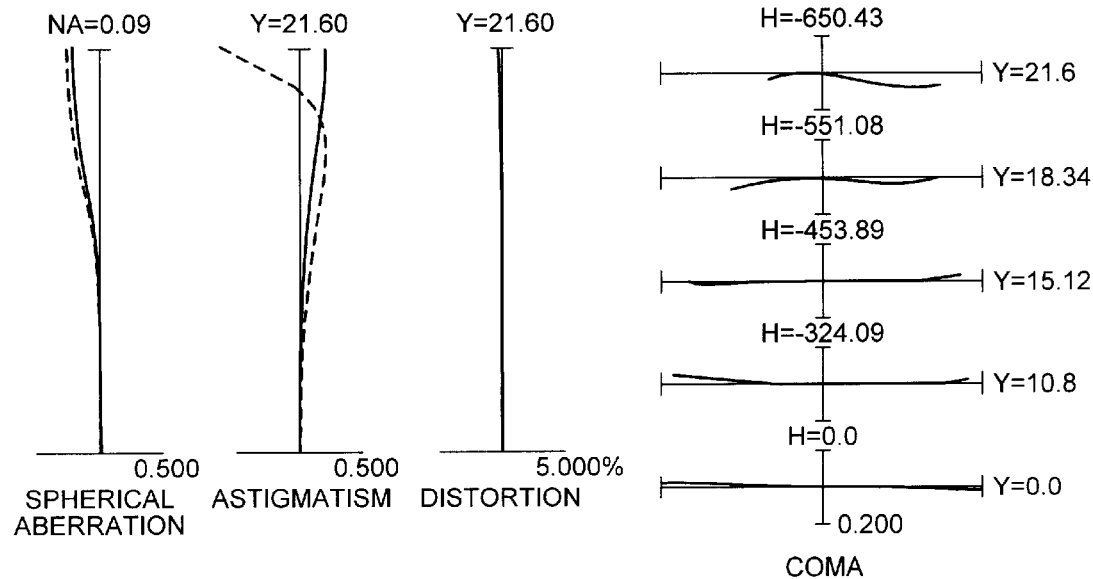
Figure 26A:
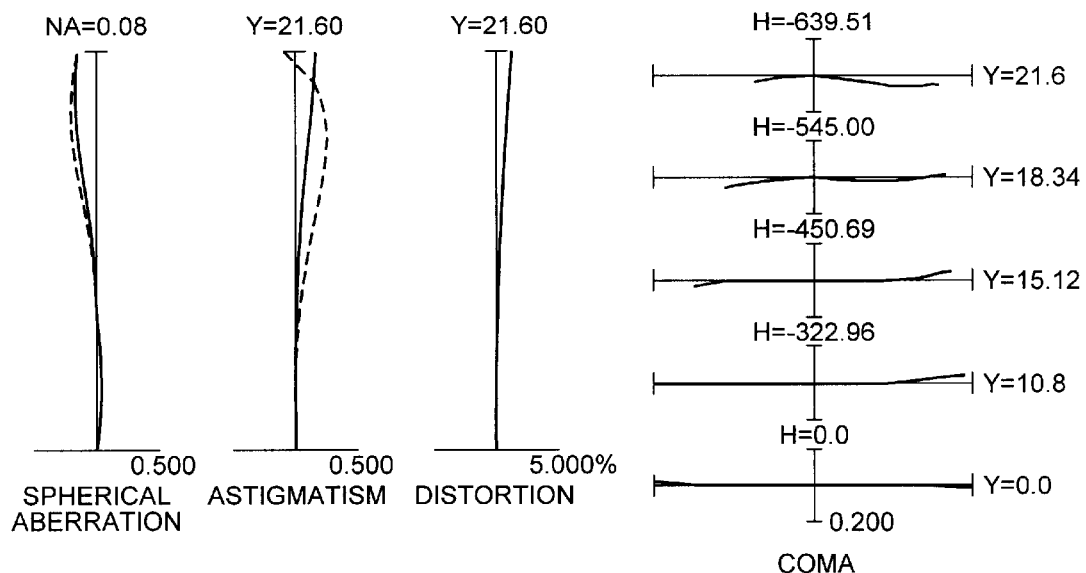
FIGS. 26A and 26B are graphs showing various aberrations in the second intermediate focal length state 26A and in the telephoto end state 26B (focused at a near distant object) of the variable focal length lens system according to Example 5 of the present invention, respectively.
Figure 26B:
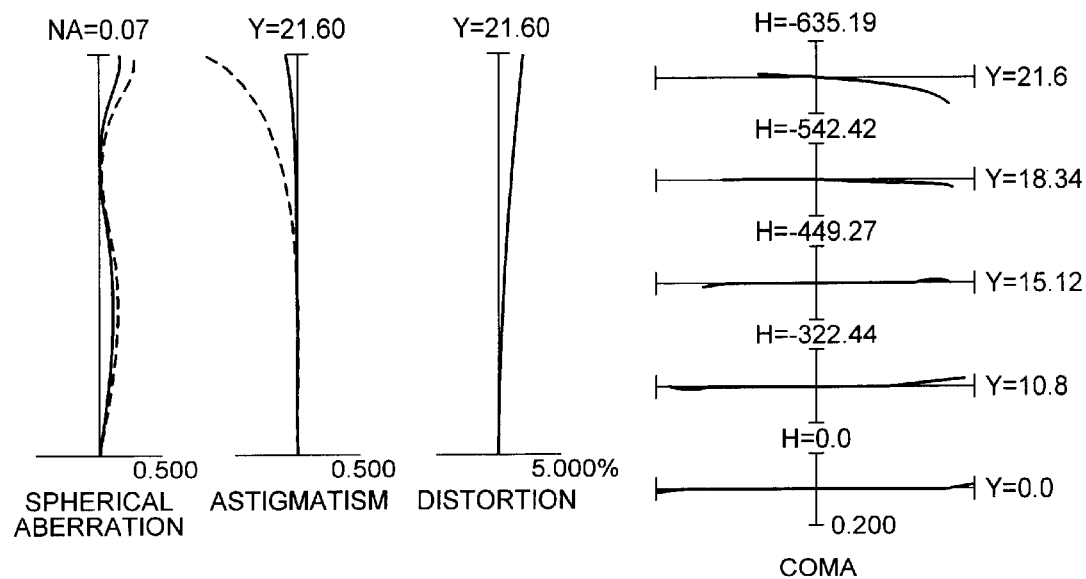

FIG. 22 is a sectional view schematically showing the configuration of a variable focal length lens system according to Example 5 of the present invention. The first lens group G1 is composed of a negative lens L11 having a concave surface facing to the object side and a double convex lens L12. The second lens group G2 is composed of a double concave lens L21 and a positive lens L22 having a convex surface facing to the object side. The third lens group G3 is composed of a positive cemented lens L31 composed of a negative meniscus lens having a convex surface facing to the object side and a positive meniscus lens having a convex surface facing to the object side, and a double convex lens L32. The fourth lens group G4 is composed of a positive meniscus lens L41 having a convex surface facing to the image side and a negative meniscus lens L42 having a concave surface facing to the object side.

In this example, an aperture stop S is arranged to the object side of the third lens group G3, and is moved together with the third lens group G3 when the state of lens positions is changed.

Various values associated with Example 5 are listed in Table 5.

TABLE 5

| f | 25.20~38.00~50.00~66.50 |
| FNO | 4.10~5.46~6.39~7.50 |
| 2ω | 83.23~58.65~45.86~35.21° |

| surface number | radius of curvature | surface distance | refractive index | Abbe number |
|---|---|---|---|---|
| 1 | −51.1941 | 0.9000 | 1.84666 | 23.83 |
| 2 | −1206.8794 | 0.1000 | 1.0 | |
| 3 | 47.9123 | 2.2500 | 1.54814 | 45.83 |
| 4 | −42.1934 | (D4) | 1.0 | |
| 5 | −20.5049 | 0.8000 | 1.74330 | 49.23 |
| 6 | 15.6764 | 0.3500 | 1.0 | |
| 7 | 13.5045 | 1.4000 | 1.80518 | 25.46 |
| 8 | 27.6006 | (D8) | 1.0 | |
| 9 | 0.0000 | 0.8500 | 1.0 | aperture stop |
| 10 | 13.6986 | 1.5000 | 1.75520 | 27.53 |
| 11 | 8.3121 | 2.6000 | 1.75500 | 52.32 |
| 12 | 48.6271 | 1.8000 | 1.0 | |
| 13 | 16.4851 | 3.3000 | 1.51680 | 64.20 |
| 14 | −22.1918 | (D12) | 1.0 | |
| 15 | −28.5714 | 2.6500 | 1.68893 | 31.16 |
| 16 | −31.2873 | 4.8500 | 1.0 | |
| 17 | −9.8592 | 1.0000 | 1.75500 | 52.32 |
| 18 | −44.3133 | (Bf) | 1.0 | |

TABLE 5-continued aspherical coefficient

<surface number 5>
κ = 1.0000
$C_4 = -5.5968 \times 10^{-5}$   $C_6 = +1.6343 \times 10^{-6}$
$C_8 = -1.2071 \times 10^{-7}$   $C_{10} = +2.6776 \times 10^{-9}$ <surface number 14>
κ = 1.0000
$C_4 = +2.7755 \times 10^{-4}$   $C_6 = +6.8058 \times 10^{-7}$
$C_8 = -5.2211 \times 10^{-9}$   $C_{10} = +1.4313 \times 10^{-10}$ <surface number 15>
κ = −4.0000
$C_4 = +1.6677 \times 10^{-4}$   $C_6 = +1.3175 \times 10^{-6}$
$C_8 = -4.4290 \times 10^{-8}$   $C_{10} = +3.0458 \times 10^{-10}$ <surface number 16>
κ = 1.0000
$C_4 = +1.0721 \times 10^{-4}$   $C_6 = +1.3175 \times 10^{-6}$
$C_8 = -3.4052 \times 10^{-8}$   $C_{10} = +1.5337 \times 10^{-10}$ Variable intervals during zooming

| f | 25.2000 | 38.0000 | 49.9999 | 66.5000 |
|---|---|---|---|---|
| D4 | 2.5732 | 5.5471 | 7.9254 | 11.0580 |
| D8 | 1.7644 | 1.3771 | 0.9987 | 0.4663 |
| D14 | 5.8993 | 2.8857 | 1.5425 | 0.6000 |
| Bf | 7.2401 | 18.0179 | 27.2395 | 38.5257 | moving distance Δ2 of the second lens group G2 while focusing from infinity to near object (magnification = −1/30) where the movement toward object is assumed to be positive

| f | 25.1996 | 37.9990 | 49.9976 | 66.4955 |
|---|---|---|---|---|
| Δ2 | 0.7192 | 0.5518 | 0.4121 | 0.3350 | values for the conditional expressions $f_1 = +112.146$
$f_2 = -18.834$
$f_3 = +12.237$
$f_4 = -15.967$
$f_{2N} = -11.841$
$f_{2P} = +31.447$
(1) $f_1/f_w = 4.450$
(2) $|f_2|/(f_w \cdot f_t)^{1/2} = 0.460$
(3) $f_w/|r_a| = 0.492$
(4) $f_w/|r_b| = 1.230$
(5) $(r_c + r_d)/f_w = 1.158$
(6) D1/D3 = 1.601
(7) $|f_4|/f_1 = 0.142$
(8) $f_1/(f_w \cdot f_t)^{1/2} = 2.740$
(9) $DW23/f_w = 0.171$
(10) $(|f_{2N}| + f_{2P})/f_w = 1.718$
(11) $(|f_2| + f_3)/f_w = 1.233$
(12) $|f_4|/f_t = 0.240$ FIGS. 23A, 23B, 24A, and 24B are graphs showing various aberrations in a state focused at infinity in a wide-angle end state (f=25.20), a first intermediate focal length state (f=38.00), a second intermediate focal length state (f=50.00), and a telephoto end state (f=66.50) of the variable focal length lens system according to Example 5 of the present invention, respectively.

FIGS. 25A, 25B, 26A, and 26B are graphs showing various aberrations in a state focused at a near object (magnification: −1/30) in the wide-angle end state (f=25.20), the first intermediate focal length state (f=38.00), the second intermediate focal length state (f=50.00), and the telephoto end state (f=66.50) of the variable focal length lens system according to Example 5 of the present invention, respectively.

As apparent from the respective diagrams showing various aberrations, excellent compensation is made for the various aberrations at the respective image distances and at the respective focal lengths.

As described above, the present invention makes it possible to provide a compact variable focal length lens system with an angle of view of more than 80° in the wide-angle end state.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A variable focal length lens system comprising, in order from an object side;
    a first lens group having a positive refractive power;
    a second lens group having a negative refractive power;
    a third lens group having a positive refractive power; and
    a fourth lens group having a negative refractive power;
    wherein when the state of lens positions is changed from a wide-angle end state to a telephoto end state, all the lens groups are moved to the object side such that the interval between the first lens group and the second lens group increases, the interval between the second lens group and the third lens group decreases, and the interval between the third lens group and the fourth lens group decreases;
    wherein each lens group from the first lens group through the third lens group is composed of two lens elements or more; and
    wherein the following conditional expressions (1) and (2) are satisfied:

$$3 < f_1/f_w < 6 \qquad (1)$$
    $$0.3 < |f_2|/(f_w \cdot f_t)^{1/2} < 0.6 \qquad (2)$$

where $f_1$ denotes the focal length of the first lens group, $f_w$ denotes the focal length of the variable focal length lens system in the wide-angle end state, $f_2$ denotes the focal length of the second lens group, and $f_t$ denotes the focal length of the variable focal length lens system in the telephoto end state.

2. The variable focal length lens system according to claim 1, wherein
    an aperture stop is arranged between the second lens group and the third lens group; and
    the first lens group includes two lens elements which is
        a negative lens element having a concave surface facing to the object side and
        a positive lens element having a convex surface facing to the object side; and
    wherein the following conditional expression (3) is satisfied:

$$0.05 < f_w/|r_a| < 0.55 \qquad (3)$$

where $r_a$ denotes the radius of curvature to the object side of the negative lens element in the first lens group.

3. The variable focal length lens system according to claim 2, wherein the second lens group includes a negative lens element located to the most object side of the second lens group; and
    wherein the following conditional expression (4) is satisfied:

$$0.7 < f_w/|r_b| < 1.3 \qquad (4)$$

where $r_b$ denotes the radius of curvature to the object side of the negative lens element located to the most object side of the second lens group.

4. The variable focal length lens system according to claim 3;
    wherein the second lens group is composed of
        a double concave lens element and
        a positive lens element having a convex surface facing to the object side and located to the image side of the double concave lens element; and
    wherein the following conditional expression (5) is satisfied:

$$0.9 < (r_c + r_d)/f_w < 1.6 \qquad (5)$$

where $r_c$ denotes the radius of curvature to the image side of the double concave lens element in the second lens group, and $r_d$ denotes the radius of curvature to the object side of the positive lens element in the second lens group.

5. The variable focal length lens system according to claim 1, wherein the second lens group includes a negative lens element located to the most object side of the second lens group; and
    wherein the following conditional expression (4) is satisfied:

$$0.7 < f_w/|r_b| < 1.3 \qquad (4)$$

where $r_b$ denotes the radius of curvature to the object side of the negative lens element located to the most object side of the second lens group.

6. The variable focal length lens system according to claim 5;
    wherein the second lens group is composed of
        a double concave lens element and
        a positive lens element having a convex surface facing to the object side and located to the image side of the double concave lens element; and
    wherein the following conditional expression (5) is satisfied:

$$0.9 < (r_c + r_d)/f_w < 1.6 \qquad (5)$$

where $r_c$ denotes the radius of curvature to the image side of the double concave lens element in the second lens group, and $r_d$ denotes the radius of curvature to the object side of the positive lens element in the second lens group.

7. The variable focal length lens system according to claim 1, wherein the following conditional expression (6) is satisfied:

$$1.4 < D1/D3 < 2.2 \qquad (6)$$

where D1 denotes variation in air interval between the first lens group and the second lens group when the state of lens positions is moved from the wide-angle end state to the telephoto end state, and D3 denotes variation in air interval between the third lens group and the fourth lens group when the state of lens positions is moved from the wide-angle end state to the telephoto end state.

8. The variable focal length lens system according to claim 1, wherein the following conditional expression (7) is satisfied:

$$0.1 < |f_4|/f_1 < 0.3 \qquad (7)$$

where $f_4$ denotes the focal length of the fourth lens group.

9. A variable focal length lens system comprising, in order from an object side;

a first lens group having a positive refractive power;

a second lens group having a negative refractive power;

a third lens group having a positive refractive power;

a fourth lens group having a negative refractive power; and an aperture stop located between the first lens group and the fourth lens group; and wherein when the state of lens positions is changed from a wide-angle end state to a telephoto end state, all the lens groups are moved to the object side such that the interval between the first lens group and the second lens group increases, the interval between the second lens group and the third lens group decreases, and the interval between the third lens group and the fourth lens group decreases;

wherein the second lens group has a negative lens having a concave surface facing to the object side, located to the most object side of the second lens group, and is moved to the object side when the lens system is focused to a near object; and wherein the following conditional expressions (8) and (9) are satisfied:

$$1.8 < f_1/(f_w \cdot f_t)^{1/2} < 3.6 \quad (8)$$

$$0.15 < DW23/f_w < 0.25 \quad (9)$$

where $f_1$ denotes the focal length of the first lens group, $f_w$ denotes the focal length of the variable focal length lens system in the wide-angle end state, $f_t$ denotes the focal length of the variable focal length lens system in the telephoto end state, and DW23 denotes the interval between the most object side lens surface of the second lens group and the aperture stop in the wide-angle end state.

10. The variable focal length lens system according to claim 9, wherein the second lens group consists of a negative lens element having double concave surfaces and a positive lens element having a convex surface facing to the object side, and wherein the following conditional expression (10) is satisfied:

$$1.3 < (|f_{2N}| + f_{2P})/f_w < 2.4 \quad (10)$$

where $f_{2N}$ denotes the focal length of the negative lens element in the second lens group, and $f_{2P}$ denotes the focal length of the positive lens element in the second lens group.

11. The variable focal length lens system according to claim 10, wherein the following conditional expression (11) is satisfied:

$$1.1 < (|f_2| + f_3)/f_w < 1.4 \quad (11)$$

where $f_2$ denotes the focal length of the second lens group, and $f_3$ denotes the focal length of the third lens group.

12. The variable focal length lens system according to claim 11, wherein the following conditional expression (12) is satisfied:

$$0.2 < |f_4|/f_t < 0.4 \quad (12)$$

where $f_4$ denotes the focal length of the fourth lens group.

13. The variable focal length lens system according to claim 9, wherein the following conditional expression (11) is satisfied:

$$1.1 < (|f_2| + f_3)/f_w < 1.4 \quad (11)$$

where $f_2$ denotes the focal length of the second lens group, and $f_3$ denotes the focal length of the third lens group.

14. The variable focal length lens system according to claim 13, wherein the following conditional expression (12) is satisfied:

$$0.2 < |f_4|/f_t < 0.4 \quad (12)$$

where $f_4$ denotes the focal length of the fourth lens group.

* * * * *